United States Patent
Kong et al.

(10) Patent No.: US 6,700,881 B1
(45) Date of Patent: Mar. 2, 2004

(54) RATE CONTROL DEVICE AND METHOD FOR CDMA COMMUNICATION SYSTEM

(75) Inventors: Seung-Hyun Kong, Seoul (KR); Young-Ky Kim, Seoul (KR); Jae-Min Ahn, Seoul (KR); Soon-Young Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/260,213

(22) Filed: Mar. 1, 1999

(30) Foreign Application Priority Data

Mar. 2, 1998 (KR) ............. 98-6833
Sep. 26, 1998 (KR) ............ 98-40167

(51) Int. Cl.[7] ............................ H04B 7/216
(52) U.S. Cl. ....................... 370/335; 370/342
(58) Field of Search ................ 370/335, 342, 370/332, 333, 252, 248, 441

(56) References Cited

U.S. PATENT DOCUMENTS

| | | | | |
|---|---|---|---|---|
| 5,490,168 A | * | 2/1996 | Phillips et al. ........ | 375/224 |
| 5,734,646 A | * | 3/1998 | I et al. ............... | 370/335 |
| 5,757,813 A | * | 5/1998 | Raith ................. | 714/708 |
| 5,930,230 A | * | 7/1999 | Odenwalder et al. ..... | 370/208 |
| 5,940,439 A | * | 8/1999 | Kleider et al. ........ | 375/225 |
| 6,031,831 A | * | 2/2000 | Tan Boon et al. ....... | 370/342 |
| 6,044,083 A | * | 3/2000 | Citta et al. .......... | 370/441 |
| 6,097,965 A | * | 8/2000 | Honkasalo et al. ...... | 455/550 |

FOREIGN PATENT DOCUMENTS

| | | |
|---|---|---|
| JP | 64-42944 | 2/1989 |
| JP | 7-336331 | 12/1995 |
| JP | 8-251140 | 9/1996 |
| JP | 9-18450 | 1/1997 |
| JP | 9-261118 | 10/1997 |
| JP | 9-261143 | 10/1997 |

\* cited by examiner

Primary Examiner—Chau Nguyen
Assistant Examiner—Soon-Dong Hyun
(74) Attorney, Agent, or Firm—Dilworth & Barrese LLP

(57) ABSTRACT

A traffic channel transmission device for a CDMA communication system using a plurality of coding rates and orthogonal codes, determines a present channel condition and adaptively selects a coding rate and an orthogonal code according to the determination. In the device, a channel receiver receives a channel signal and a controller analyzes the received signal to decide an environment of a channel in service and generates a coding rate select signal and orthogonal code information according to the decision result. A channel transmitter includes a channel encoder for encoding transmission data at a coding rate selected according to the coding rate select signal and an orthogonal modulator for generating an orthogonal code according to the orthogonal code information to spread the encoded data with the generated orthogonal code, whereby the channel transmitter adaptively encodes and spreads the transmission data according to the channel environment. The orthogonal code information includes a number and a length of the orthogonal code.

27 Claims, 11 Drawing Sheets

RATE CONTROL DEVICE AND METHOD FOR CDMA COMMUNICATION SYSTEM

BACKGROUND OF THE INVENTION

1. Field of the Invention

The present invention relates generally to communication systems, and in particular, to an apparatus and method for adaptively controlling a channel data rate according to a channel environment in a CDMA communication system.

2. Description of the Related Art

At present, CDMA (Code Division Multiple Access) communication systems are implemented in accordance with the IS-95 Standard. With the progress of mobile communication technology, the number of mobile communication service subscribers is increasing and demands for various services are rising in proportion to the increased user demand. To date many methods have been proposed to meet the subscribers' demands.

FIG. 1 illustrates a structure of a forward traffic channel transmission device for the CDMA communication system, wherein the traffic channel includes a fundamental channel and a supplemental channel.

Referring to FIG. 1, a channel encoder and puncturing part 10 encodes and punctures input data and outputs symbol data. A convolutional encoder or a turbo encoder can be used for the channel encoder and puncturing part 10. A symbol repetition part 20 repeats the respective encoded symbol data for the input data having different bit rates to output a single common symbol rate. An interleaver 30 interleaves an output of the symbol repetition part 20. A block interleaver can be used for the interleaver 30.

A long code generator 91 generates long codes for the user identification, which are uniquely assigned to the respective subscribers. A decimator 92 decimates the long codes so as to match a rate of the long codes to a rate of the symbols output from the interleaver 30. A mixer 40 mixes the encoded symbols output from the interleaver 30 with the long codes output from the decimator 92.

A signal mapping part 50 maps binary data output from the mixer 40 into 4-level data by converting data "0" to "+1" and data "1" to "−1". An orthogonal modulator 60 modulates data output from the signal mapping part 50 with an orthogonal code. A Walsh code can be used for the orthogonal code. In this case, Walsh codes of lengths 64, 128 and 256 bits can be used. A spreader 70 spreads the orthogonal modulation signal output from the orthogonal modulator 60 by combining it with spreading sequences. PN (Pseudo-random Noise) sequences can be used for the spreading sequences. Accordingly, a QPSK (Quadrature Phase Shift Keying) spreader can be used for the spreader 70. A gain controller 80 controls a gain of the spread signal input from the spreader 70 according to a gain control signal Gc.

In operation, when the convolutional encoder is used for the channel encoder and puncturing part 10, the coding rate is 1/3 and the constraint length, k=9, for an IS-95 system. Therefore, one input data bit is encoded into three encoded bits (i.e., three symbols) in the channel encoder and puncturing part 10 (which performs 1/3 rate convolutional encoding or 1/3 rate forward error correction (FEC)). Forward error correction is utilized to provide coding gain to a channel so as to compensate for an increase in a BER (Bit Error Rate) at a mobile station (for the case of a forward link) and a base station (for the case of a reverse link). An increase in the BER of a channel may arise as a result of the channel having a reduced SNR (Signal-to-Noise Ratio) due to an increase in signal path loss, noise and interference.

It is well known that CDMA communication systems cannot provide reliable communication service when a mobile station is located at an outer service area of the base station or is in a bad channel environment. In this case, it is preferable to change the coding rate to enhance the quality of the communication service in the bad channel environment. That is, when the channel SNR is reduced due to a bad channel environment or an increased distance between a mobile station and a base station, it is preferable to use a coding rate (or FEC rate) lower, 1/6 for example, than the present coding rate of 1/3.

In particular, when the distance between the base station and the mobile station increases, a reception device is very susceptible to path loss or noise on the link channel and interference, so that the channel SNR is reduced unless a transmission device increases the transmission power or performs a pertinent compensation. Therefore, when the traffic channel transmission device with the fixed channel structure of FIG. 1 experiences an increased BER (Bit Error Rate) due to a reduction in SNR, the base station increases a forward link traffic power in order to compensate for the increase in the BER. Therefore, it is preferable to use the FEC with a lower coding rate than the FEC in use. Given a 1/3 coding rate it has been shown that channel gain is lower by about 0.2–1 dB as compared with a 1/6 coding rate. For example, the forward reception power of a mobile station using the 1/3 coding rate is lower by about 1 dB than that of a mobile station using the 1/6 coding rate, when the mobile station is far from the base station or in a bad forward channel environment. Therefore, the base station should increase the forward link transmission power, resulting in a waste of transmission power and low communication performance.

Unlike the channel transmission device with the fixed channel structure of FIG. 1, a channel transmission/reception device for a 3rd generation multicarrier CDMA system as proposed in the TIA/EIA TR45.5 conference, includes a scheme for transmitting and receiving the respective channel data by distributing them to the multicarrier. For example, when three carriers are used and a rate 1/3 encoder is used, the multicarrier scheme encodes the respective input data bit into three encoded bits (i.e., symbols) using the rate 1/3 encoder and transmits the encoded bits using the three carriers after repetition and interleaving. This is well disclosed in Korean patent application No. 61616/1997 filed by the applicant of this invention. Here, the respective carriers each have a bandwidth of 1.2288 Mhz (hereinafter, referred to as 1.25 Mhz) which is identical to the IS-95 channel bandwidth. Therefore, the three carriers have a combined or collective bandwidth of 3.6864 Mhz, which is identical to three separate channel bandwidths.

The forward link of the 3G multicarrier system can employ an overlay method where it shares the same frequency band with the IS-95 forward channel. In this case, it may be interfered with the IS-95 system. In addition, it is preferable to use the coding rate lower than the present coding rate of 1/3, even when the channel SNR is reduced due to the bad channel environment or the increased distance between the mobile station and the base station.

SUMMARY OF THE INVENTION

It is therefore an object of the present invention to provide methods and an apparatus for adaptively changing a coding rate of channel data according to the channel environment in a CDMA communication system.

It is another object of the present invention to provide a traffic channel transmission apparatus for a CDMA communication system having a plurality of coding rates and orthogonal codes, which determines a present channel condition and adaptively selects a coding rate and an orthogonal code according to the determination, and a method for operating the same.

It is further another object of the present invention to provide a traffic channel transmission apparatus for a CDMA communication system having a plurality of coding rates and orthogonal codes, which selects the coding rate and the orthogonal code according to control information transmitted from a transmission device, and a method for operating the same.

It is still another object of the present invention to provide a traffic channel transmission apparatus for a multicarrier CDMA communication system having a plurality of coding rates and orthogonal codes, which determines a present channel condition and adaptively selects the coding rate and the orthogonal code according to the determination, and a method for operating the same.

It is yet another object of the present invention to provide a traffic channel transmission device for a multicarrier CDMA communication system having a plurality of coding rates and orthogonal codes, which selects the coding rate and the orthogonal code according to control information transmitted from a transmission device, and a method for operating the same.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A traffic channel transmission/reception device according to an embodiment of the present invention increases channel performance by decreasing the coding rate thereby causing an increase in the coding gain. The method has particular applicability for those situations where path loss or interference increases between a base station and a mobile station on a CDMA link channel. For example, when using a 1/6 coding rate rather than a conventional 1/3 coding rate, it is possible to improve performance against an increase in signal path loss, noise and interference. Therefore, in a relatively bad channel environment, it is more efficient to use the lower coding rate of 1/6 rather than the higher coding rate of 1/3.

An illustrative embodiment will be described which includes a method of improving a receiver's performance by channel encoding at two different rates as applied to a 3G multicarrier CDMA system.

In a CDMA communication system, under certain channel conditions the use of an encoder operated at a lower coding rate has the effect of increasing the channel gain and thereby improving channel performance. In the light of this, a system having a coding rate which is initially set for a call, adaptively selects the lower coding rate for the forward channel transmission to improve the performance. In the illustrative embodiment, the channel transmission device comprises a plurality of channel encoders having different coding rates and corresponding orthogonal modulators for generating orthogonal codes. The channel transmission device can adaptively control the coding rate and the orthogonal modulation according to the channel environment. Further, the channel reception device examines the coding rate and the orthogonal code according to control information output from the channel transmission device and thereafter, performs orthogonal demodulation and channel decoding for the received signal in accordance with the control information.

Although the present invention will be described as comprising two coding rates (i.e. 1/3 and 1/6), they are provided merely by way of example. It is to be appreciated that the use of other coding rates are well within the scope of the present invention. Moreover, for purposes of illustration, the traffic channel of the forward link may be characterized as comprising a base station as the transmission device and a mobile station as the reception device.

Figure 1:
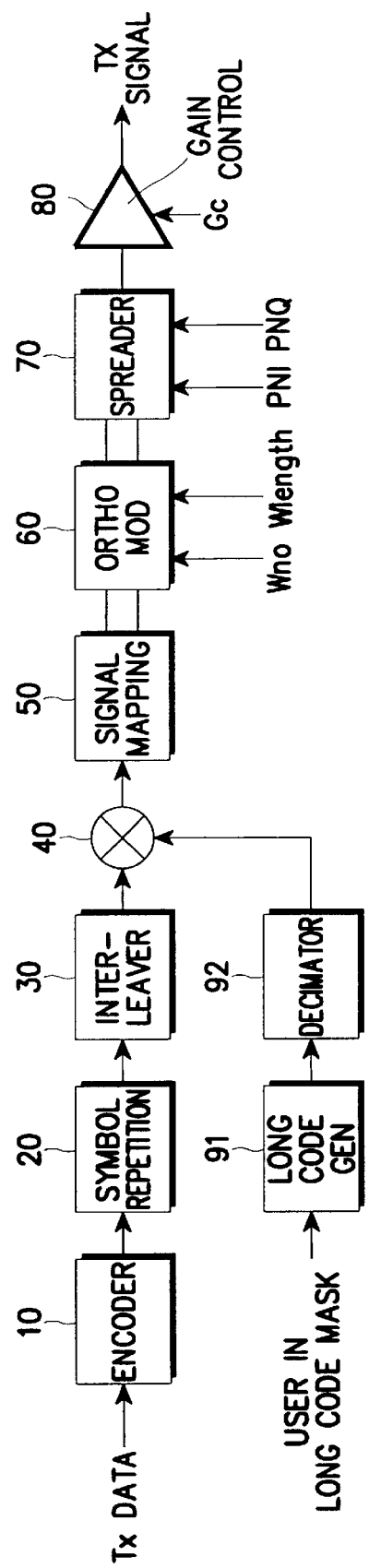
FIG. 1 is a diagram illustrating a channel transmission device in a conventional CDMA communication system.
Figure 2:
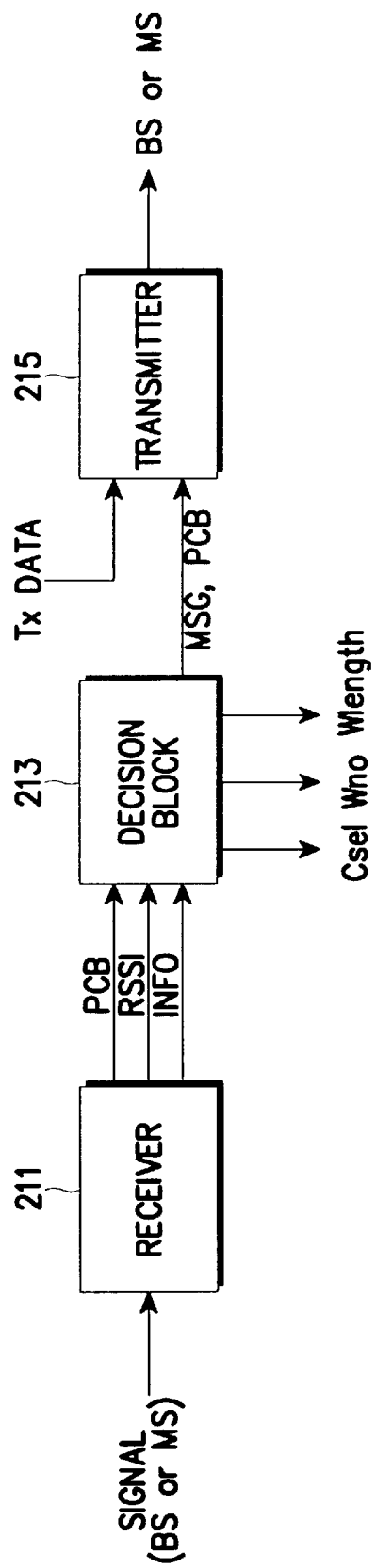
FIG. 2 is a diagram illustrating a decision apparatus for changing a channel data rate according to a channel environment according to an embodiment of the present invention.

FIG. 2 is a block diagram of a decision apparatus for analyzing a channel environment and selecting a coding rate in response in accordance with one aspect of the present invention.

Referring to FIG. 2, receiver part 211 processes a signal received from a sending station (i.e. base or mobile). The receiver 211 extracts a power control bit (PCB) from the received signal to detect a received signal strength indicator (RSSI), and outputs PCB, RSSI, and INFO data to a decision block 213.

The control block 213 analyzes the INFO, the PCB and the received signal strength output from the receiver 211 and, if rate change is required, generates a control signal Csel for selecting a coding rate, orthogonal code number and length signals Output signals Wno and Wlength are output from the decision block for selecting the orthogonal code corresponding to the selected coding rate. The decision block 213 compares a signal gain, the number of power increase requests minus the number of power decrease requests (i.e., the number of up command PCB's minus the number of down command PCBs) and the energy of the received signal strength with the respective threshold values to detect the channel environment. That is, the decision block 213 generates the signals Csel, Wno and Wlength for selecting the lower FEC rate, when the input parameters have values lower than the lower bound threshold values. That is when:

the signal gain<S_low_Th<P_high_Th, and (average E[RSSI])<R_low_Th where S_low_Th: is a PCB value accumulated for a particular duration;

Th: represents the threshold value;

S_low, P_high, R_low: represent lower bound threshold values of the signal, the PCB and the RSSI, respectively).

Further, the decision block 213 generates the signals Csel, Wno and Wlength for selecting the higher FEC rate, when the input parameters have values higher than the upper bound threshold values. That is when:

signal gain>S_high_Th>P_low_Th, and E[RSSI]>R_high_Th where S_high_Th: is a PCB value accumulated for a particular duration;

In determining a channel data rate change the decision block 213 can use all or some of the parameters.

A transmitter 215 transmits messages MSG, including a message required for the rate change, output from the decision block 213 to the receiver station. The apparatus described at FIG. 2 can be implemented either at a BS or MS for sending the message MSG.

Figure 3:
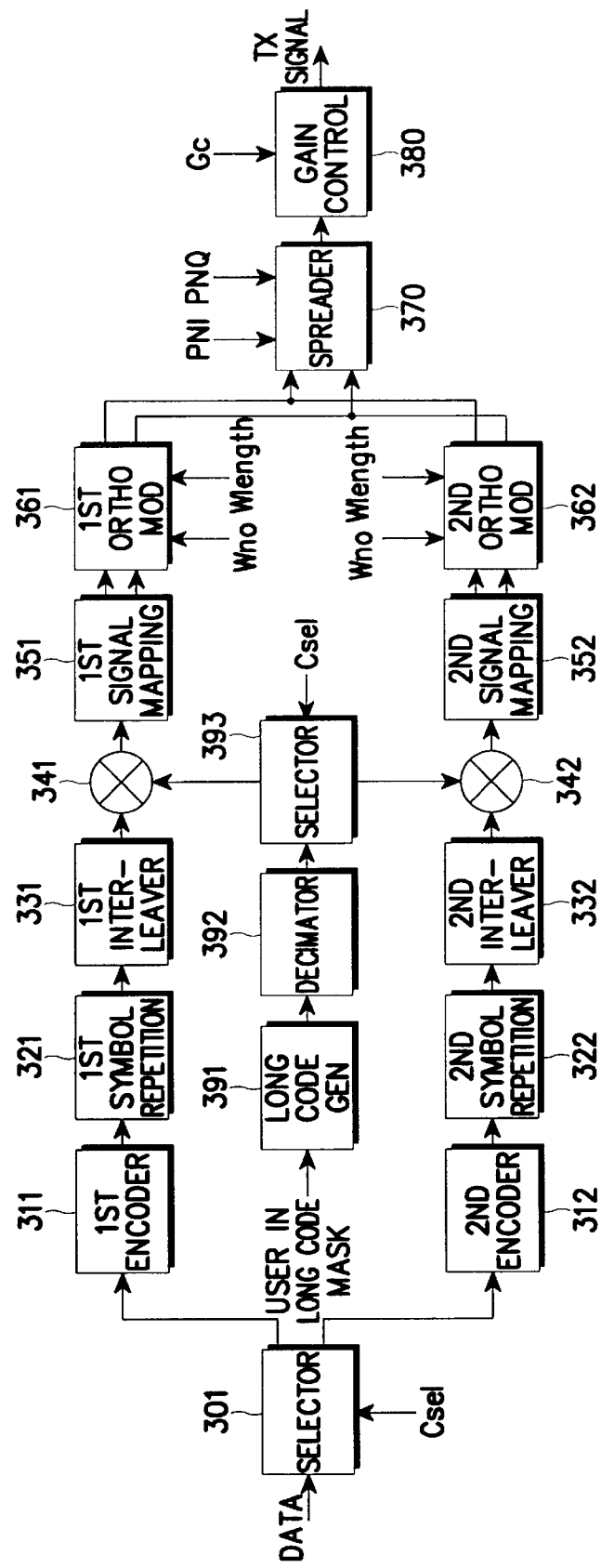
FIG. 3 is a diagram illustrating a single carrier forward traffic channel transmission device including plural encoders of different rates.

FIG. 3 is a block diagram illustrating a structure of a forward link traffic channel transmission device including a rate 1/3 encoder and a rate 1/6 encoder according to an embodiment of the present invention.

Referring to FIG. 3, a selector 301 has a first output connected to an input of a first encoder 311 and a second output connected to an input of a second encoder 312. The selector 301 receives input data to be transmitted and selectively outputs the input data to the first encoder 311 or the second encoder 312 according to the select signal Csel output from the decision block 213.

The first encoder 311, upon reception of data input from the selector 301, encodes the input data into data symbols at a first coding rate (the 1/3 coding rate). That is, the first encoder 311 encodes one input data bit into three symbols. A convolutional encoder or a turbo encoder can be used for the first encoder 311. A first symbol repetition part 321 receives the data encoded at the first coding rate, and repeats the symbols output from the first encoder 311 as necessary so as to match the symbol rates of the data having different bit rates. A first interleaver 331 interleaves first encoded data output from the first symbol repetition part 321. A block interleaver can be used for the first interleaver 331.

The second encoder 312, upon reception of the data input from the selector 301, encodes and punctures the input data into data symbols at a second coding rate (the 1/6 coding rate). That is, the second encoder 312 encodes one input data bit into six symbols. A convolutional encoder or a turbo encoder can be used for the second encoder 312. A second symbol repetition part 322 receives the data encoded at the second coding rate, and repeats the symbols output from the second encoder 312 so as to match the symbol rates of the data having different bit rates. A second interleaver 332 interleaves second encoded data output from the second symbol repetition part 322. A block interleaver can be used for the second interleaver 332.

A long code generator 391 generates long codes for the user identification, which are uniquely assigned to the respective subscribers. A decimator 392 decimates the long codes so as to match a rate of the long codes to a rate of the symbols output from the interleavers 331 and 332. A selector 393 selectively outputs the decimated long code output from the decimator 392 to a mixer 341 or a mixer 342 according to the select signal Csel. The selector 393 switches the decimated long code to the first mixer 341 to select the 1/3 coding rate and to the second mixer 342 to select the 1/6 coding rate. The mixer 341 mixes the first encoded data output from the first interleaver 331 with the long code output from the selector 393. The second mixer 342 mixes the second encoded data output from the second interleaver 332 with the long code output from the selector 393.

A first signal mapping part 351 converts levels of the binary data output from the first mixer 341 by converting data "0" to "+1" and data "1" to "−1". A first orthogonal modulator 361 includes a first orthogonal code generator (not shown) which generates a first orthogonal code for orthogonally modulating the first encoded data according to the orthogonal code number and length signals Wno and Wlength output from the decision block 213. The first orthogonal modulator 361 multiples the first orthogonal code generated according to the orthogonal code number and length signals Wno and Wlength by the data output from the first signal mapping part 351 to generate a first orthogonal modulation signal. Here, it is assumed that the Walsh code is used for the orthogonal code and a Walsh code of length 256 is used for the data encoded at the first coding rate of 1/3.

A second signal mapping part 352 converts levels of the binary data output from the second mixer 342 by converting data "0" to "+1" and data "1" to "−1". A second orthogonal modulator 362 includes a second orthogonal code generator (not shown) which generates a second orthogonal code for orthogonally modulating the second encoded data according to the orthogonal code number and length signals Wno and Wlength output from the decision block 213. The second orthogonal modulator 362 multiples the second orthogonal code generated according to the orthogonal code number and length signals Wno and Wlength by the data output from the second signal mapping part 352 to generate a second orthogonal modulation signal. Here, it is assumed that the Walsh code is used for the orthogonal code and a Walsh code of length 128 is used for the data encoded at the second coding rate of 1/6.

A spreader 370 combines the first and second orthogonal modulation signals output from the first and second orthogonal modulators 361 and 362 with the received spreading sequence to spread a transmission signal. Here, the PN sequence can be used for the spreading sequence and the QPSK spreader can be used for the spreader 370. A gain controller 380 controls a gain of the spread signal input from the spreader 370 according to a gain control signal Gc.

The operation of the traffic channel transmission device will be provided with specific reference to FIGS. 2 and 3.

The decision block 213 analyzes the parameters PCB, received signal strength (RSSI) and INFO output from the receiver 211 to determine whether to change the channel data rate. Here, the parameters include the received signal strength RSSI, the accumulated value of the PCB received during a particular duration, some integer multiple of 1.25 milliseconds, and the message indicator, INFO representing a request by the other party for a change in the channel data rate during communication. First, the transmitter 215 determines whether the signal strength (i.e RSSI) of the signal received during communication is lower than the lower bound threshold value. When the strength RSSI of the received signal is lower than the threshold value, the current radio sensitivity is poor. In this case, the decision block 213 may generate the signals Csel, Wno and Wlength to decrease the present channel data rate.

In addition, the mobile station examines the signals transmitted from the base station and outputs the power control bit PCB to control the transmission power of the base station through the reverse link, and vice versa through the forward link. The base station then examines the power control bit PCB from the mobile station and counts the number of power-up PCBs and the number of the power-down PCBs received. When the count value of the power-up PCBs, within a predetermined time duration exceeds a predetermined value, the decision block 213 may generate the control signals to increase the current channel data rate. Otherwise, if the count value of the power-down PCBs, within a predetermined time duration exceeds a predetermined value, the decision block 213 may generate the control signals to decrease the present channel data rate.

In addition, the rate change request can also be made at the mobile station. In this case, the mobile station makes a request using the message INFO, and the decision block 213 in the base station then receives the request message INFO through the receiver 211.

The decision block 213 can use other parameters in addition to or in substitution of the parameters stated above to measure the channel environment and performance. The present illustrative embodiment, however, uses only the three parameters stated above. Furthermore, depending on the design of the algorithm of the decision block 213, it is also possible to initially change the channel data rate whenever the respective parameters are received or only when a subset of parameters are received. In addition, when the channel environment becomes poor, the decision block 213 can improve the channel environment by selecting the lower coding rate. When the channel environment improves, the decision block 213 can restore the coding rate to the original higher coding rate.

To change the coding rate the decision block 213 generates a new orthogonal code number and length signals Wno and Wlength to allocate a new channel during the coding rate change. When the coding rate is changed, the orthogonal code should be also changed. To change the coding rate the decision block 213 generates the select signal Csel for selecting the encoder having the corresponding coding rate, and the orthogonal code number and length signals Wno and Wlength for generating a new orthogonal code corresponding to the selected coding rate. When the encoder having a lower coding rate is selected, a shorter orthogonal code should be generated; when the encoder having a higher coding rate is selected, a longer orthogonal code should be generated.

FIG. 3 shows the transmission channel structure in which the forward link is switched to the first encoder 311 of the 1/3 FEC rate or the second encoder 312 of the 1/6 FEC rate in accordance with the channel environment. The data input path is switched to either the encoder 311 or the encoder 312 by the selector 301. Thus, the transmission data undergoes a different FEC rate according to the selected data path. That is, based on the select signal Csel output from the decision block 213, the selector 301 switches the input data to the first encoder 311 when the channel environment is good, and switches the input data to the second encoder 312 when channel environment is poor.

In addition, since the orthogonal code should be also changed according to the change of the FEC rate, it is necessary to select one of the orthogonal modulators 361 and 362 according to the change of the FEC rate. That is, when the first encoder 311 is selected to use the 1/3 FEC rate, the orthogonal code generator in the first orthogonal modulator 361 generates the orthogonal code of length 256 according to the orthogonal code number and length Wno and Wlength. Therefore, the orthogonal modulator 361 multiplies the signal encoded at the 1/3 FEC rate by the orthogonal code to generate the first orthogonal modulation signal, and the spreader 370 spreads the first orthogonal modulation signal using the PN sequences PNI and PNQ.

Furthermore, when the second encoder 312 is selected to use the 1/6 FEC rate, the orthogonal code generator in the second orthogonal modulator 362 generates the orthogonal code of length 128 according to the orthogonal code number and length Wno and Wlength. Therefore, the orthogonal modulator 362 multiplies the signal encoded at the 1/6 FEC rate by the orthogonal code to generate the second orthogonal modulation signal, and the spreader 370 spreads the second orthogonal modulation signal using the PN sequences PNI and PNQ.

As can be appreciated from the foregoing description, there is no change in structure of the spreader 370 for spreading the orthogonal modulation signal using the PN sequences. Accordingly, the 1/6 FEC rate scheme is identical in structure to the 1/3 FEC rate scheme, except for the encoder and interleaver. In particular, in the 1/6 FEC rate scheme, the bit rate of the final stage is increased from 576 to 1152 bits per frame. In addition, the interleaver size is also increased to twice its normal size.

Figure 4:
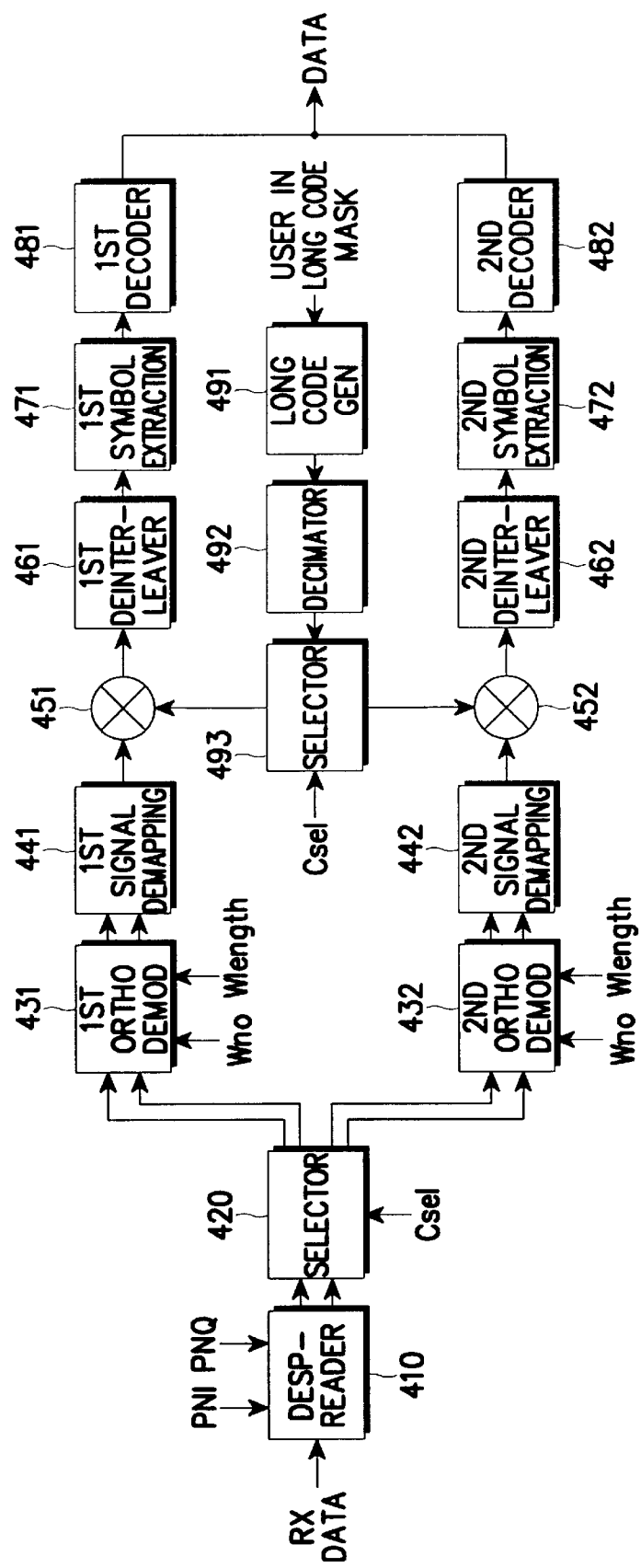
FIG. 4 is a diagram illustrating a reverse traffic channel reception device including plural decoders of different rates.

FIG. 4 illustrates the structure of a reception device according to an embodiment of the present invention. The reception device is controlled by a decision block 213 having the same structure as that shown in FIG. 2. In the figure, a despreader 410 despreads a received signal by combining the received signal with the spreading (i.e. PN) sequences. A selector 420 has a first output connected to a first orthogonal demodulator 431 and a second output connected to a second orthogonal demodulator 432. The selector 420 switches the despread signal output from the despreader 410 to the first orthogonal demodulator 431 or the second orthogonal demodulator 432 according to a select signal Csel output from the decision block 213.

The first orthogonal demodulator 431 includes a first orthogonal code generator for generating a first orthogonal code according to the orthogonal code number and length signals Wno and Wlength, output from the decision block 213. When connected to the selector 420, the first orthogonal demodulator 431 generates the first orthogonal code according to the orthogonal code number and length signals Wno and Wlength and multiplies the despread data by the first orthogonal code to output a first orthogonal demodulation signal. Here, it is assumed that a Walsh code is used for the orthogonal code and a Walsh code of length 256 is used for the data encoded at the 1/3 coding rate. A first signal demapping part 441 demaps the 4-level signal output from the first orthogonal demodulator 431 into binary data by converting data "+1" to "0" and data "−1" to "1".

The second orthogonal demodulator 432 includes a second orthogonal code generator for generating a second orthogonal code according to the orthogonal code number and length signals Wno and Wlength output from the decision block 213. When connected to the selector 420, the second orthogonal demodulator 432 generates the second orthogonal code according to the orthogonal code number and length signals Wno and Wlength and multiplies the despread data by the second orthogonal code to output a second orthogonal demodulation signal. Here, it is assumed that a Walsh code is used for the orthogonal code and a Walsh code of length 128 is used for the data encoded at the 1/6 coding rate. A second signal demapping part 442 demaps the 4-level signal output from the second orthogonal demodulator 432 into binary data by converting data "+1" to "0" and data "−1" to "1".

A long code generator 491 generates a long code identical to that generated at the transmitter. Here, the long codes are the user identification codes, and the different long codes are assigned to the respective subscribers. A decimator 492 decimates the long code so as to match a rate of the long code to a rate of the signals output from the signal demapping parts 441 and 442. A selector 493 switches the decimated long code output from the decimator 492 to a mixer 451 or a mixer 452 according to the select signal Csel. In other words, the selector 493 switches the decimated long code to the first mixer 451 to select the 1/3 coding rate, and switches the decimated long code to the second mixer 452 to select the 1/6 coding rate. The first mixer 451 mixes an output of the signal demapping part 441 with the long code to delete the long code contained in the received signal, and the second mixer 452 mixes an output of the signal demapping part 442 with the long code to delete the long code contained in the received signal.

A first deinterleaver 461 deinterleaves the received signal output from the first mixer 451 to rearrange the interleaved first encoded data into the original state. A first symbol extraction part 471 extracts the original encoded data by deleting the symbol-repeated encoded data from the output of the first deinterleaver 461. A first decoder 481 having a 1/3 decoding rate, decodes the encoded data output from the first symbol extraction part 471 into the original data.

A second deinterleaver 462 deinterleaves the received signal output from the second mixer 452 to rearrange the interleaved second encoded data into the original state. A second symbol extraction part 472 extracts the original encoded data by deleting the symbol-repeated encoded data from the output of the second deinterleaver 462. A second decoder 482 having a 1/6 decoding rate, decodes the encoded data output from the second symbol extraction part 472 into the original data.

It should be appreciated from FIG. 4 that the reception device of the CDMA communication system has a construction which is the inverse of that shown in FIG. 3.

As described above, the illustrative embodiment discloses a method of using the 1/6 FEC rate for the communication between base station and mobile station within a bad channel environment which has been degraded due to either a decrease of SNR or an increased BER in order to provide better link performance as compared with the case where the 1/3 FEC rate is used. In operation, a base station uses both the 1/3 FEC rate and the 1/6 FEC rate. In the case where only the 1/3 FEC rate is used, there are 256 available orthogonal codes of length 256. When only the 1/6 FEC rate is used there are 128 available orthogonal codes of length 128. However, when the two orthogonal code sets are both used, the use of a single orthogonal code of length 128 makes two of the corresponding orthogonal codes of length 256 unavailable. The use of one orthogonal code of length 256 makes one orthogonal code of length 128 unavailable. This is because there are orthogonal codes that are correlated between the two orthogonal code sets.

When all of the users have a 1/3 rate FEC, the maximum number of users can be 256, however the maximum number of users will be 128 if all the users have a 1/6 FEC rate. For this reason, use of the selectable 1/6 FEC rate is restricted since it decreases the system capacity (i.e., the number of users). It is possible to limit the number of forward channels using the 1/6 FEC rate by allowing use of the 1/6 rate encoder to the forward link having a high signal path loss, a high signal transmission power or a high BER. In addition, since use of one orthogonal code of length 128 precludes the use of two orthogonal codes of length 256, the number of link channels using the rate 1/6 encoder is limited as long as it is possible to assign a sufficient number of orthogonal codes the mobile stations. When utilizing the method of present invention the base station should be designed to switchably use both the rate 1/3 encoder and the rate 1/6 encoder. The base station could order a mobile station in a certain condition to switch from the 1/3 FEC rate to the 1/6 FEC rate, and could order another mobile station in a certain other condition, described below, to switch from the 1/6 FEC rate to the 1/3 FEC rate.

Moreover, in some cases, it is also possible to initially select one of the 1/3 FEC rate and the 1/6 FEC rate at the beginning of a channel setup process. Also, the base station may allow a mobile station requesting the high forward traffic channel transmission power to preferentially use the 1/6 FEC rate as long as available orthogonal codes can be assigned without establishing the conditions required to determine whether to permit a rate change to either the 1/3 FEC rate or the 1/6 FEC rate. Other possible setting conditions (i.e., energy per chip: Ec, or chip energy to interference ratio: Ec/Io) can be determined depending on the received power of the forward pilot channel, and the signal path loss, fading and signal transmission power of the forward link or the reverse link.

Orthogonal Code Assignment

The following is a description and explanation of the present invention directed with specific reference to orthogonal code assignment. Since the orthogonal codes are generated through the Hadamard transform, there exist non-orthogonal codes between a 2N*2N orthogonal code set and a 2(N+1)*2(N+1) orthogonal code set. Therefore, for a base station allowing 2 sets of different orthogonal codes (e.g., an orthogonal code set of length 2*N and 2*(N+1)), orthogonal codes among the 2N*2N orthogonal code set to a forward channel, careful selection is necessary in order to maintain the orthogonality with the existing assigned orthogonal code of length 2(N+1). This means that the base station should examine the non-orthogonality between every orthogonal code of length 2N for a new assignment and all the existing assigned orthogonal codes of 710 length 2(N+1).

The structure shown in FIGS. 2 through 4 can be so designed as to change the FEC rate at the forward link.

Figure 5:
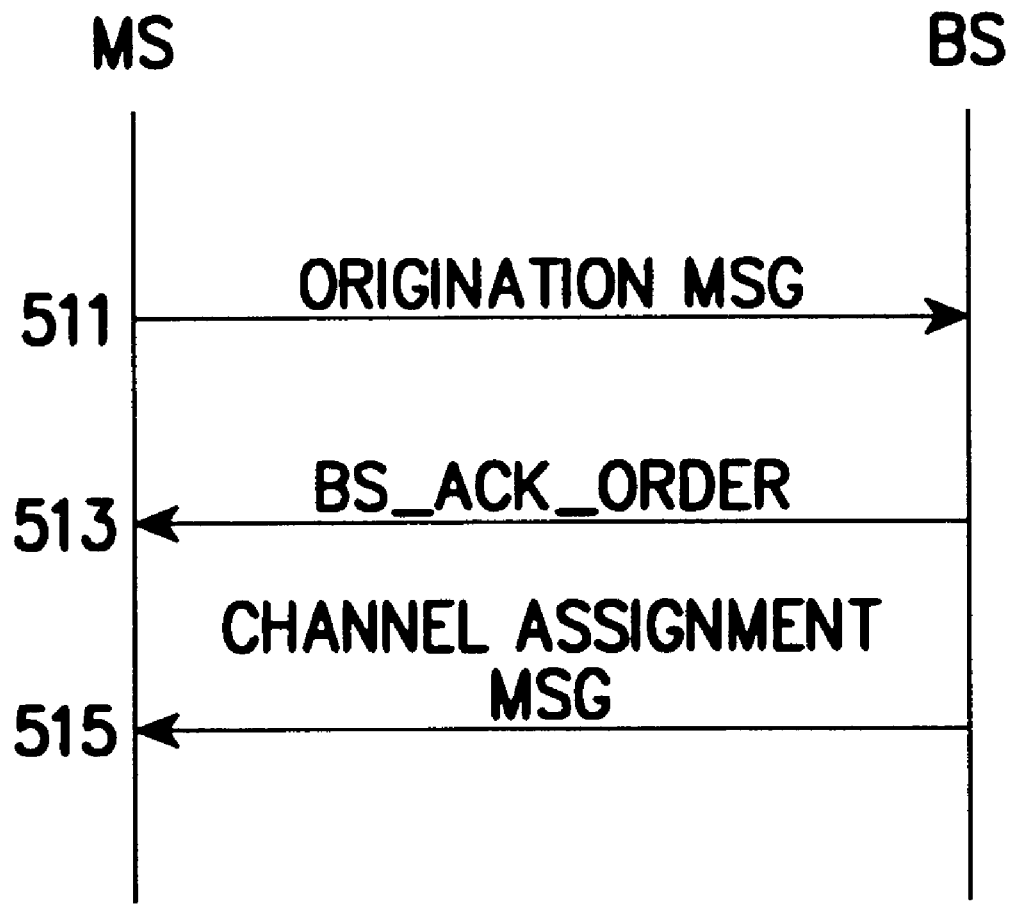
FIG. 5 is a flowchart illustrating a method whereby a mobile station, in response to a base station order, selects and encoder using a paging channel and an access channel during a call setup according to an embodiment of the present invention.
Figure 6:
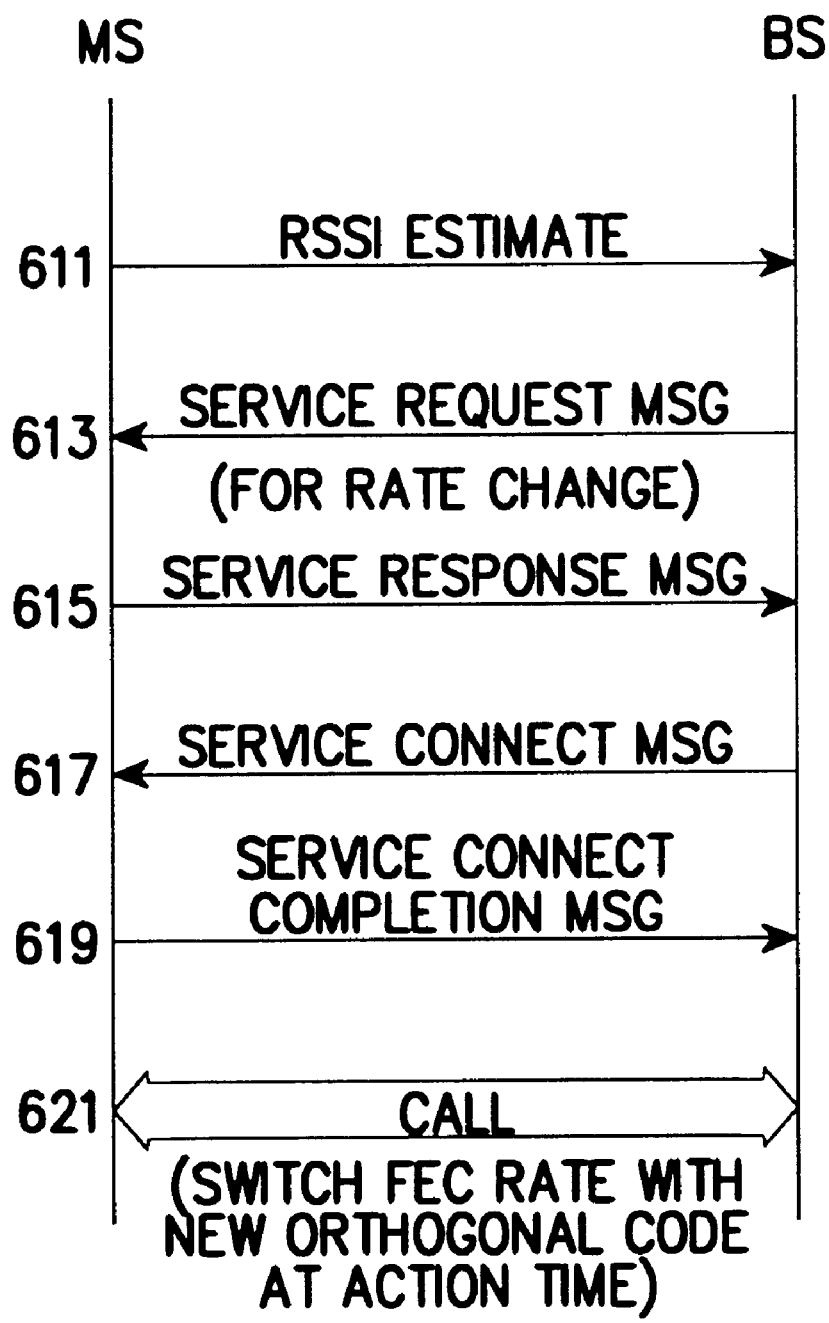
FIG. 6 is a flowchart illustrating a method whereby a mobile station, in response to a base station order, changes the rate during the call progressing according to an embodiment of the present invention.

FIGS. 5 and 6 illustrate a method for switching the coding rate to the 1/3 FEC rate or the 1/6 FEC rate for the forward link of a 3G CDMA system.

FIG. 5 illustrates a method in which the base station allows the mobile station to request the second encoder 312 of the 1/6 FEC rate through the paging and access channels during the call setup. A description will be provided below directed to the operation of selecting the 1/6 FEC rate for the forward link from the start of the call through the access channel and the paging channel at the call setup stage, FIG. 6 illustrates a method in which the base station allows the mobile station to change the coding rate in the middle of a call. A description will be provided below directed to an operation of switching from the 1/3 FEC rate to the 1/6 FEC rate during the call processing in the IS-95B system.

Referring to FIG. 5, for the call setup, the mobile station sends an origination message (shown in the Table 1) to the base station 511. In the origination message of Table 1, a new MOB_P_REV value (which is different from the existing value) is assigned to the mobile station which can change the coding rate, and the mobile station sends the origination message by putting its own MOB_P_REV value therein. Thereafter, upon reception of the origination message, the base station sends to the mobile station a channel assignment message 515 (shown in the following Tables 2A to 2G).

Table 2B shows the channel assignment message for ASSIGN_MODE="000",
Table 2C shows the channel assignment message for ASSIGN_MODE="001",
Table 2D shows the channel assignment message for ASSIGN_MODE="010",
Table 2E shows the channel assignment message for ASSIGN_MODE="011",
Table 2F shows the channel assignment message for ASSIGN_MODE="100",
Table 2G shows the channel assignment message for ASSIGN_MODE="101", In step 513, the base station may first send a BS_ACK_Order in acknowledgment of the origination message. In the channel assignment message, a new ENCODER_RATE field is assigned for the coding rate to send the designated coding rate. The mobile station then fixes the coding rate according to the received channel assignment message and searches the forward link channel using the given frequency band and orthogonal code.

TABLE 1

| Field | Length [bits] |
| --- | --- |
| MSG_TYPE("00000100") | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8 x MSID_LEN |
| AUTH_MODE | 2 |
| AUTHR | 0 or 18 |
| RANDC | 0 or 8 |
| COUNT | 0 or 6 |
| MOB_TERM | 1 |
| SLOT_CYCLE_INDEX | 3 |
| MOB_P_REV | 8 |
| SCM | 8 |
| REQUEST_MODE | 3 |
| SPECIAL_SERVICE | 1 |
| SERVICE_OPTION | 0 or 16 |
| PM | 1 |
| DIGIT_MODE | 1 |
| NUMBER_TYPE | 0 or 3 |
| NUMBER_PLAN | 0 or 4 |

TABLE 2A

| Field | Length [bits] |
| --- | --- |
| MSG_TYPE("00001000") | 8 |
| One or more occurrences of the following record: | |
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8 x ADDR_LEN |
| ASSIGN_MODE | 3 |
| ADD_RECORD_LEN | 3 |
| Additional Record Fields | 8 x ADD_RECORD_LEN |
| ENCODER_RATE | 2 |
| RESERVED | 0–5 |
| | (as needed) |

TABLE 2B if ASSIGN_MODE="000", the additional record fields shall be:

| Field | Length [bits] |
| --- | --- |
| FREQ_INCL | 1 |
| CODE_CHAN | 8 |
| CDMA_FREQ | 0 or 11 |
| FRAME_OFFSET | 4 |
| ENCRYPT_MODE | 2 |
| RESERVED | 0–7 |
| | (as needed) |

TABLE 2C if ASSIGN_MODE="001", the additional record fields shall be:

| Field | Length [bits] |
| --- | --- |
| RESPOND | 1 |
| FREQ_INCL | 1 |
| CDMA_FREQ | 0 or 11 |
| One or more occurrences of the following field: | |
| PILOT_PN | 9 |
| RESERVED | 0–7 |
| | (as needed) |

TABLE 2D if ASSIGN_MODE="010", the additional record fields shall be:

| Field | Length [bits] |
| --- | --- |
| RESPOND | 1 |
| ANALOG_SYS | 1 |
| USE_ANALOG_SYS | 1 |
| RESERVED | 5 |
| BAND_CLASS | 5 |

TABLE 2E if ASSIGN_MODE="011", the additional record fields shall be:

| Field | Length [bits] |
|---|---|
| SID | 15 |
| VMAC | 3 |
| ANALOG_CHAN | 11 |
| SCC | 2 |
| MEM | 1 |
| AN_CHAN_TYPE | 2 |
| DSCC_MSB | 1 |
| RESERVED | 5 |
| BAND_CLASS | 5 |

TABLE 2F if ASSIGN_MODE="100", the additional record fields shall be:

| Field | Length [bits] |
|---|---|
| FREQ_INCL | 1 |
| RESERVED | 74 |
| DEFAULT_CONFIG | 3 |
| GRANTED_MODE | 2 |
| CODE_CHAN | 8 |
| FRAME_OFFSET | 4 |
| ENCRYPT_MODE | 2 |
| BAND_CLASS | 0 or 5 |
| CDMA_FREQ | 0 or 11 |

TABLE 2G if ASSIGN_MODE="101", the additional record fields shall be:

| Field | Length [bits] |
|---|---|
| RESPOND | 1 |
| FREQ_INCL | 1 |
| BAND_CLASS | 0 or 5 |
| CDMA_FREQ | 0 or 11 |
| One or more occurrences of the following field: | |
| PILOT_PN | 9 |
| RESERVED | 0–7 (as needed) |

Referring to FIG. 6, during an active state where a call is connected between the base station and the mobile station, the base station examines the channel environment with the mobile station by estimating, for example, the RSSI. In step 611, the base station estimates the RSSI, selects a coding rate lower than the present to coding rate when the RSSI is lower than a threshold value R_low_th, and selects a coding rate higher than the present coding rate when the RSSI is higher than a threshold value R_high_th.

In the active state, since the base station and the mobile station exchange messages through the traffic channels, a new field for the encoder rate and the orthogonal code is added to a service configuration shown in the following Table 3 in order to switch the coding rate of the mobile station. 16 bits are assigned for the new field of the service configuration; the first 2 bits are assigned for the encoder rate, the next 8 bits are assigned for the orthogonal code, and the last 6 bits are reserved bits. Although a RECORD_LEN value of a service request message shown in the following Table 4 is 12 in the existing IS-95B Standard, it is 14 in the present embodiment since two octets are added. This is changed in the same manner even in a service response message shown in Table 5 and a service connect message shown in Table 6. The contents of the service configuration are input to the type-specific fields of the messages (i.e., the service request message, the service response message and the service connect message).

By way of example, Table 3 represents the service configuration for the case where the two coding rates of 1/3 and 1/6 are used. In this example, if the mobile station includes at least two encoders having different coding rates and the orthogonal code length is changed according to the coding rates, the lengths of the ENCODER_RATE field and the CODE_CHAN field of Table 3 are also changed to accommodate all the cases, and the RECORD_LEN values of Tables 4, 5 and 6 are also adjusted.

After the service configuration is corrected, the base station sends the service request message and selects the new coding rate and orthogonal code to change the coding rate, in step 613. In response to the service request message, the mobile station then outputs the service response message through the reverse traffic channel, in step 615. Here, if the mobile station does not respond to the service request message, the base station repeats step 613 by continually re-sending the service request message to change the coding rate until the mobile station sends the service response message responding to the request message. In step 617, if the service configuration of the mobile station coincides with that of the base station, the base station sends the service connect message and sets a rate change action time of the ACTION_TIME field, or implements the service comment message by default a predetermined time after receiving the message. In step 619, the mobile station sends a service connect completion message through the reverse link to acknowledge the service connect message. In step 621, the mobile station and the base station both change the rate at the set action time.

TABLE 3

| Type-Specific Field | Length [bits] |
|---|---|
| FOR_MUX_OPTION | 16 |
| REV_MUX_OPTION | 16 |
| FOR_RATES | 8 |
| REV_RATES | 8 |
| NUM_CON_REC | 8 |
| NUM_CON_REC occurrences of the following record: | |
| RECORD_LEN | 8 |
| CON_REF | 8 |
| SERVICE_OPTION | 16 |
| FOR_TRAFFIC | 4 |
| REV_TRAFFIC | 4 |
| ENCODER_RATE | 2 |
| CODE_CHAN | 8 |
| RESERVED | 6 |

TABLE 4

| Field | Length [bits] |
|---|---|
| MSG_TYPE("00010010") | 8 |
| ACK_SEQ | 3 |
| MSG_SEQ | 3 |
| ACK_REQ | 1 |
| ENCRYPTION | 2 |
| SERV_REQ_SEQ | 3 |
| REQ_PURPOSE | 4 |

TABLE 4-continued

| Field | Length [bits] |
|---|---|
| Zero or one occurrence of the following record: | |
| RECORD_TYPE | 8 |
| RECORD_LEN | 8 |
| Type-specific fields | 8 × RECORD_LEN |

TABLE 5

| Field | Length [bits] |
|---|---|
| MSG_TYPE ("00010011") | 8 |
| ACK_SEQ | 3 |
| MSG_SEQ | 3 |
| ACK_REQ | 1 |
| ENCRYPTION | 2 |
| SERV_REQ_SEQ | 3 |
| RESP_PURPOSE | 4 |
| Zero or one occurrence of the following record: | |
| RECORD_TYPE | 8 |
| RECORD_LEN | 8 |
| Type-specific fields | 8 × RECORD_LEN |

TABLE 6

| Field | Length [bits] |
|---|---|
| MSG_TYPE ("00010100") | 8 |
| ACK_SEQ | 3 |
| MSG_SEQ | 3 |
| ACK_REQ | 1 |
| ENCRYPTION | 2 |
| USE_TIME | 1 |
| ACTION_TIME | 6 |
| SERV_CON_SEQ | 3 |
| RESERVED | 5 |
| One occurrence of the following record: | |
| RECORD_TYPE | 8 |
| RECORD_LEN | 8 |
| Type-specific fields | 8 × RECORD_LEN |

TABLE 7

| Field | Length [bits] |
|---|---|
| MSG_TYPE ("00010100") | 8 |
| ACK_SEQ | 3 |
| MSG_SEQ | 3 |
| ACK_REQ | 1 |
| ENCRYPTION | 2 |
| SERV_REQ_SEQ | 4 |
| RESERVED | 3 |

It is possible to change the coding rate of the voice service and the packet data service differently. That is, during the packet data service, the coding rate of the supplemental channel for the packet service can be processed through a dedicated control channel (DCCH). In addition, when the message is received through the traffic channel, not through the DCCH, the coding rate can be processed in the same manner required by the fundamental channel. For example, when 2 bits are used for the coding rate (providing four available cases), the two cases are used in changing the coding rate for the fundamental channel and other two cases are used in changing the coding rate for the supplemental channel.

As used in the examples above, 256 orthogonal codes of length 256 bits are used for the 1/3 coding rate and 128 orthogonal codes of length 128 bits are used for the 1/6 coding rate. Here, since the orthogonal codes of length 256 are created by applying the Hadamard transform to the orthogonal codes of length 128, one orthogonal code of length 128 does not satisfy orthogonality with two orthogonal codes of length 256, losing the orthogonality between the channels. Therefore, assignment of one orthogonal code of length 128 decreases the available number of orthogonal codes of length 256 by two. Alternately, assignment of one orthogonal code of length 256 makes one orthogonal code of length 128 unusable. The base station continuously monitors the assigned orthogonal codes of length 128 and 256 to assign the new orthogonal codes so as to avoid the non-orthogonality with the previously assigned orthogonal codes.

In this manner, the present embodiment maintains a good channel condition by changing the coding rate and the orthogonal code according to the channel environment. Here, the transmission power is considered to maintain a better tolerance for the channel environment. Further, the orthogonal code is so assigned to avoid breaking the orthogonality among the forward link channels. This is, it is desirable to have lower transmission power for the same channel performance. Accordingly, the present embodiment changes the coding rate according to the channel environment, taking into consideration the transmission power. Further, if the orthogonal code is changed while the coding rate is changed by the base station or the mobile station in the same cell, it is determined whether there is an orthogonal code causing the non-orthogonality between the different orthogonal code sets. In this way, it is possible to solve the interference and non-orthogonality problems of the CDMA communication system.

Figure 7A:
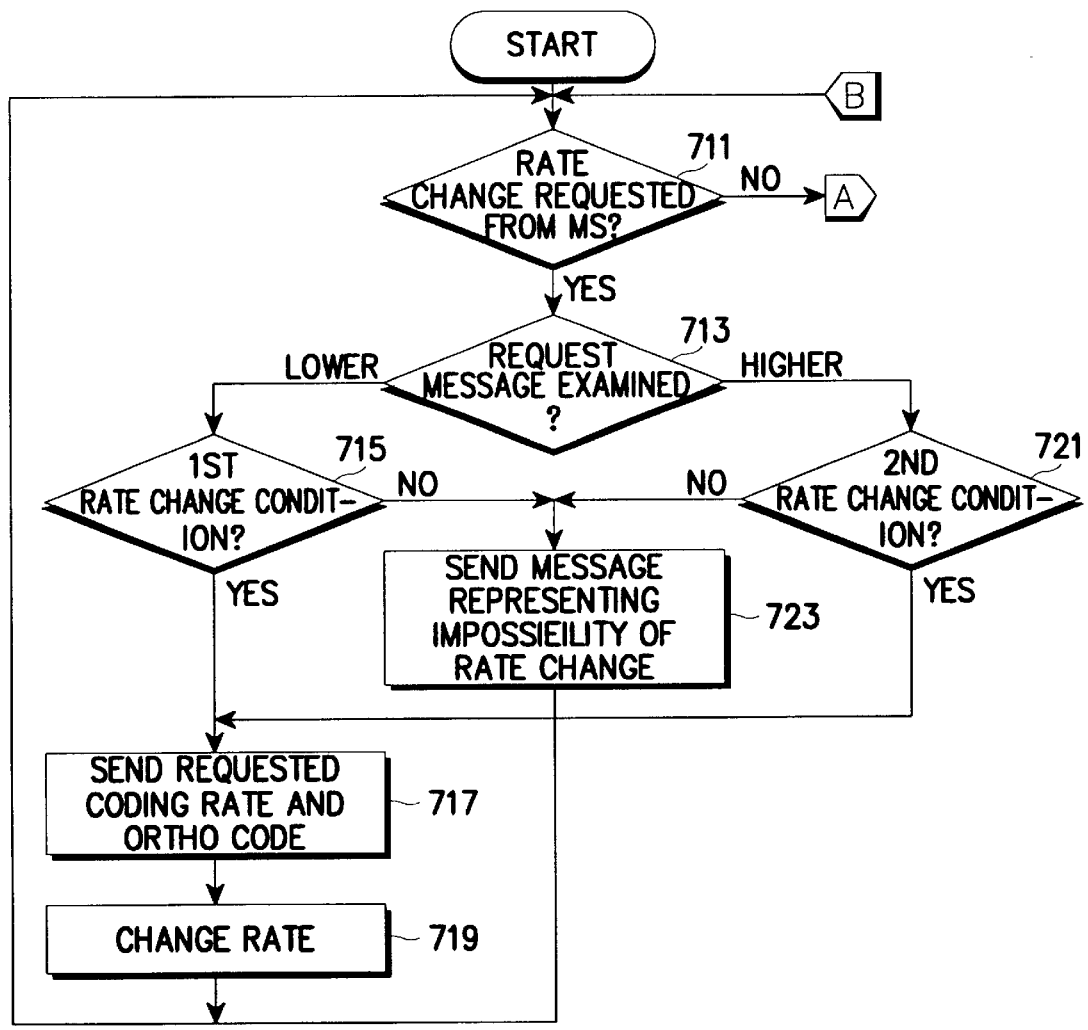
FIG. 7A is a flowchart illustrating a method whereby a base station changes a data channel rate upon reception of a rate change request message from a mobile station according to an embodiment of the present invention.
Figure 7B:
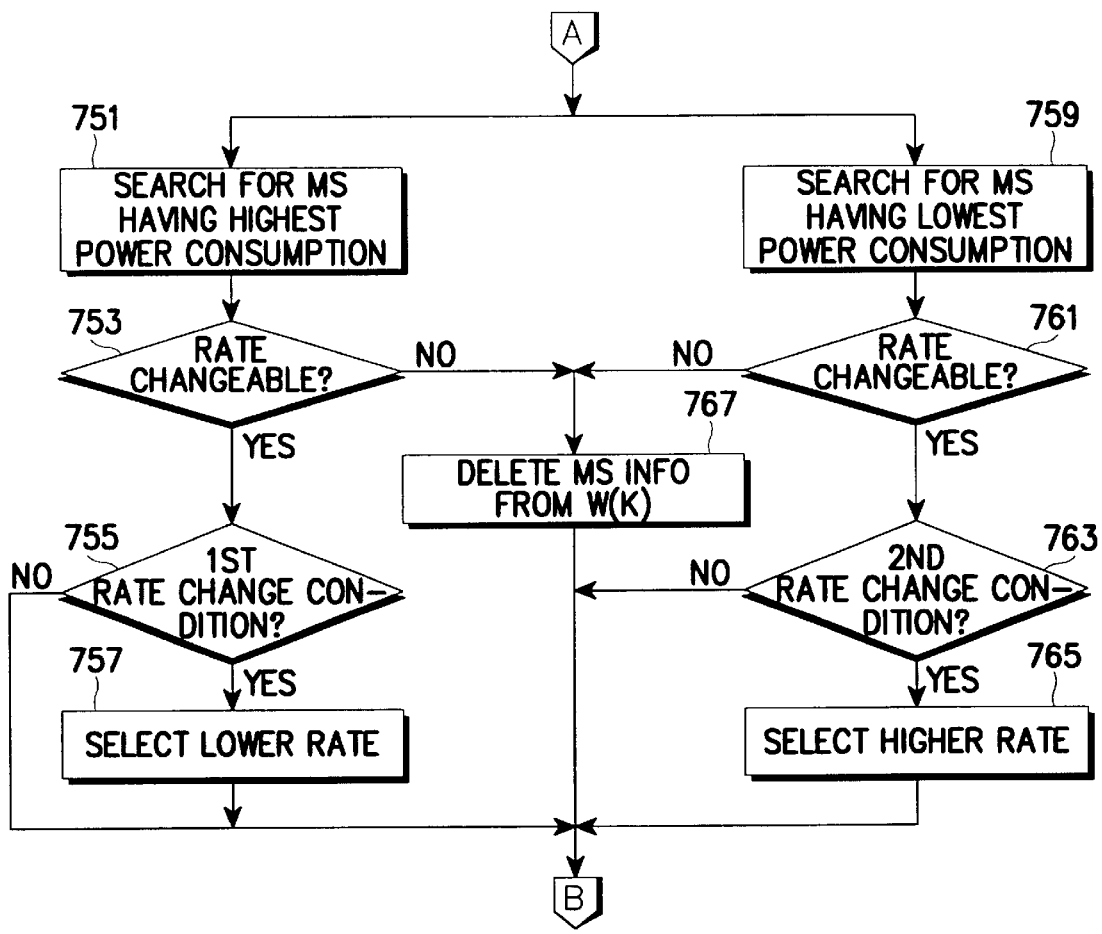
FIG. 7B is a flowchart illustrating a method whereby a base station changes the data channel rate of a mobile station when a rate change request message is not received from the mobile station according to an embodiment of the present invention.

FIGS. 7A and 7B are flowcharts illustrating a rate change operation performed in the decision block 213 of the base station. More specifically, FIG. 7A illustrates a rate change operation performed in the base station upon reception of the rate change request message from a particular mobile station, and FIG. 7B illustrates the procedure where the base station analyzes the channel environment of the mobile station to determine whether to change the rate when the mobile station does not generate the rate change request message. It should be noted that the base station can perform the procedures of FIGS. 7A and 7B in parallel.

Figure 8:
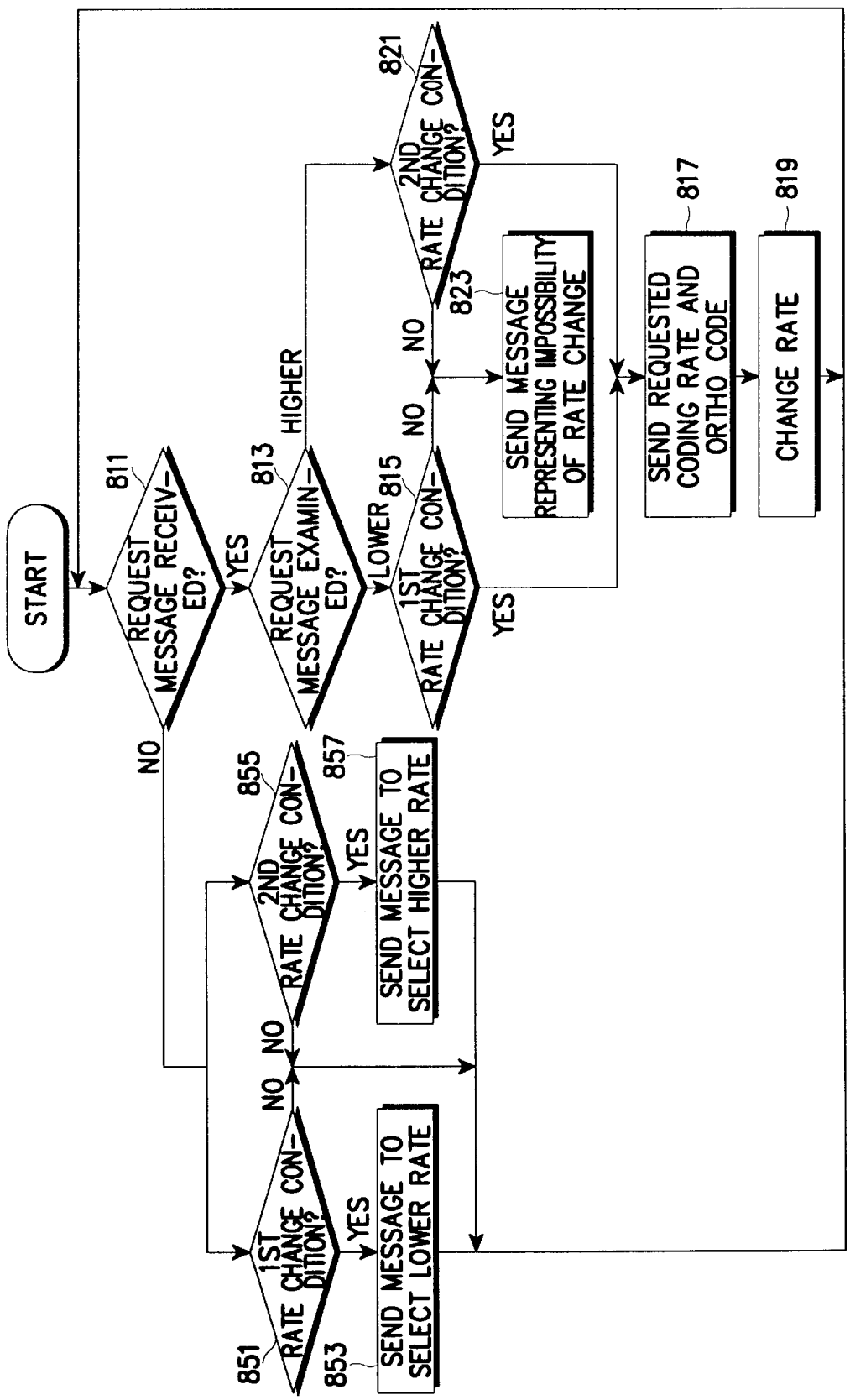
FIG. 8 is a flowchart illustrating a procedure in which the mobile station changes the rate upon reception of a rate change request message from the base station and analyzes a channel environment to send a rate change request message to the base station based on the analysis according to an embodiment of the present invention.

FIG. 8 illustrates the procedure where the mobile station performs the rate change operation with the base station, for the situation where the mobile receives a rate change request message from the base station or when a rate change condition occurs as the channel environment is changed.

Figure 9:
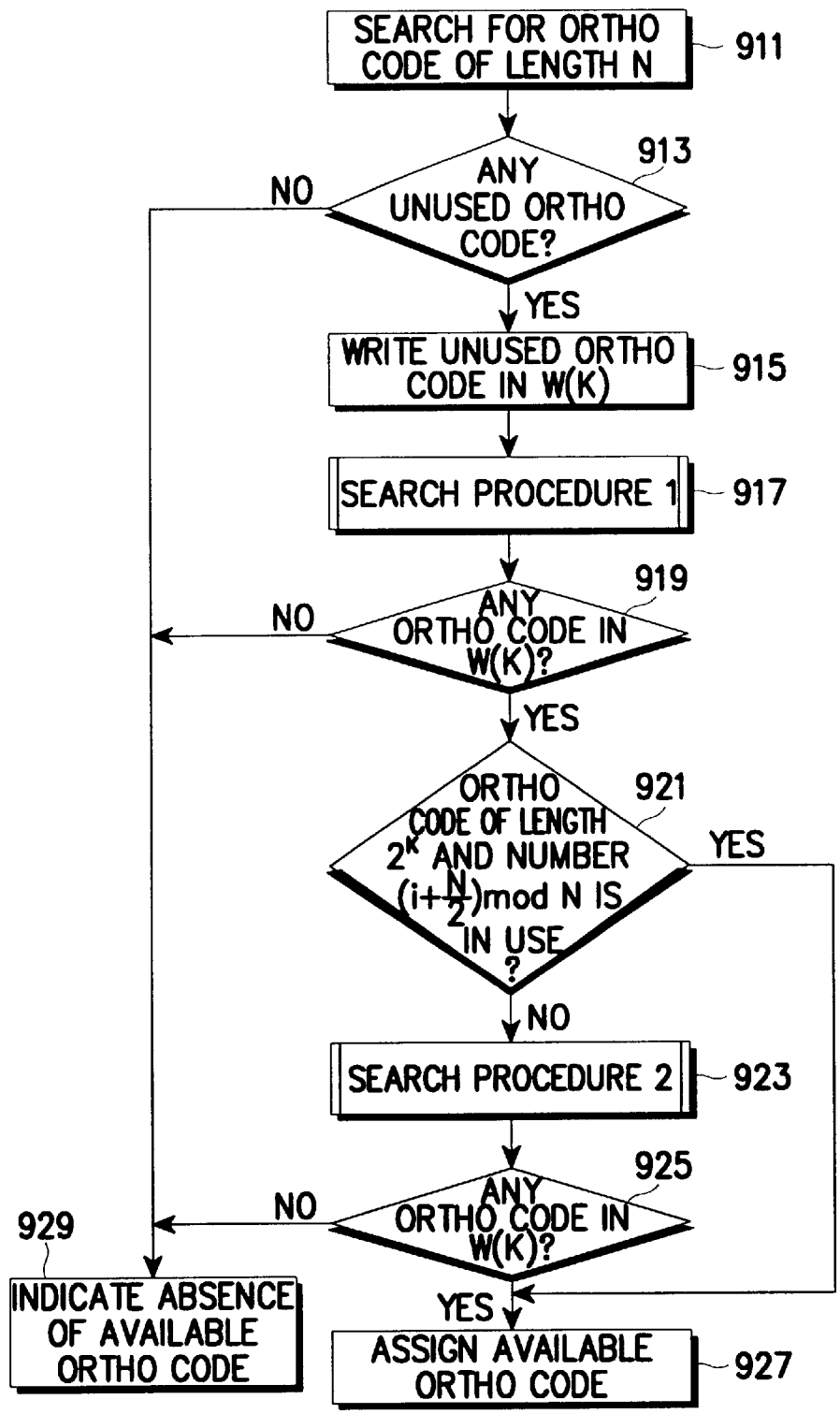
FIG. 9 is a flowchart illustrating a procedure in which the base station changes an orthogonal code during a data channel rate change according to an embodiment of the present invention.

FIG. 9 is a flowchart illustrating a procedure for assigning an orthogonal code corresponding to a change in the coding rate. That is, when assigning a forward channel to the mobile station, the base station assigns orthogonal codes in such a manner that the number of available orthogonal codes is as large as possible. FIG. 9 shows the procedure in which the base station assigns the orthogonal codes to the mobile station according to an embodiment of the present invention.

The present embodiment assumes that coding rate and the length of the corresponding orthogonal codes are simultaneously changed in accordance with the channel environment. However, it is also possible to independently change the coding rate and the length of the orthogonal code. Furthermore, the present embodiment assigns the longer orthogonal code when the coding rate is increased (e.g., from 1/6 to 1/3), and assigns the shorter orthogonal code when the coding rate is decreased (e.g., from 1/3 to 1/6), thereby maintaining the same chip rate irrespective of the change in the rate. However, it is also possible to change the coding rate and the orthogonal code without maintaining the same chip rate during the channel communication between the base station and the mobile station.

In the following description, the procedure for assigning the orthogonal code will be described with reference to FIG. 9, and then the rate change procedure between the base station and the mobile station will be described with reference to FIGS. 7A, 7B and 8.

Referring initially to FIG. 9, when a mobile station requests assignment of the orthogonal code of length N (where $N=2^K$) according to a change in the channel assignment or the coding rate, a rate controller (not shown) searches for the available orthogonal codes in step 911. Here, the orthogonal codes should be assigned such that the available orthogonal codes are maximized. To this end, in step 913, the rate controller searches an orthogonal code table to determine whether there are unused orthogonal codes of length N. When all the orthogonal codes of length N are used (i.e., assigned to the channel), the procedure goes to step 929 to indicate unavailability of the orthogonal codes and then terminates.

However, when there are available orthogonal codes of length N, the available orthogonal codes are written in a search list W(k), in step 915. The search list W(k) stores information about the unused orthogonal codes in the form of w(k,i) as follows:

$$W(k) = \begin{bmatrix} w(k, l_1) \\ w(k, l_2) \\ w(k, l_3) \\ \vdots \\ w(k, l_N) \end{bmatrix}$$

where $0 \leq l_1 < l_2 < l_3 \ldots N-1$ where k is an integer representing the length of the Walsh codes and i is a Walsh code number, where i=0, 1, 2, ..., N−1. Accordingly, if it is assumed that 11th, 12th, 15th, 21th and 30th orthogonal codes among the orthogonal codes of length $2^k$ are not in use, the search list W(k) consists of the orthogonal codes w(k,11), w(k,12), w(k,15), w(k,21) and w(k,30).

After that, in step 917, a search procedure 1 is performed on the search list to search those orthogonal codes which are non-orthogonal with orthogonal codes in use whose length is longer than $2^k$, and to extract those orthogonal codes from the search list W(k). That is, in the search procedure 1, the orthogonal codes not satisfying the orthogonality with the orthogonal codes presently in use among the orthogonal codes of length longer than $2^k$ are deleted from the search list W(k). Stated more precisely, the orthogonal codes that are not orthogonal with the orthogonal codes w(k+j,i) (where $j \leq 1$, i=0, 1, 2, ..., $2^{k+1}-1$), are deleted from the search list W(k). Variable j is incremented by one to increase the length of the orthogonal code. The search and extraction procedure is repeated for all the orthogonal codes of length $2^{K+J}$ with all the orthogonal codes in the list W(k). The search procedure 1 performed in step 917 is defined as:

---

SEARCH PROCEDURE 1
1. set j ← 1
2. while k+j ≦ maximum
   do {
    2.1 find Walsh code(s) w(k,i) in the list W(k), which is (are) not
        orthogonal with w(k+j,i) in use can be equal to a subset of
   {i=0,1,2, ..., $2^{k+j}-1$}
    2.2 extract the Walsh codes w(k+i) which satisfy 2.1 from
        search Walsh code list W(k)
    2.3 set j ← j+1
   }

---

After performing the search procedure 1, it is determined in step 919 whether there are any remaining orthogonal codes in the search list W(k) (i.e. is w(k,i)>0). When the search list W(k) is empty, does not have any orthogonal code, an indication of that state is provided in step 929.

However, when the search list W(k) is not empty, the process continues to step 921. At step 921, a search is made for the orthogonal codes w(k,j) in the list W(k) to determine whether an orthogonal code w(k,(J+N)/2 mod N is presently in use or not. If such orthogonal codes exist in the search list W(k), the corresponding orthogonal codes are assigned as available orthogonal codes in step 927.

However, when the search list W(k) does not have the corresponding orthogonal codes, a second search procedure 2 is performed in step 923 to delete the orthogonal codes not satisfying the orthogonality with the orthogonal codes presently in use among the orthogonal codes of length shorter than $2^k$. Stated more precisely, among the presently used orthogonal codes w(k−j,i) (where $j \geq 1$, i=0, 1, 2, ..., $2^{k-1}-1$), those orthogonal codes not satisfying the orthogonality with the orthogonal codes stored in the search list W(k) are deleted from the search list W(k). As j is incrementally decreased to decrease the length of the orthogonal code, the search and extraction procedure is repeated for all the orthogonal codes. The search procedure 2 performed in step 923 is defined as:

---

SEARCH PROCEDURE 2
1. set j ← 1
2. while k−j ≧ 1
   do {
    2.1 find Walsh code(s) w(k,i) in the list W(k), which is (are) not
        orthogonal with w(k−j,i) in use can be equal to a subset of
   {i=0,1,2, ..., $2^{k-j}-1$}
    2.2 extract the Walsh codes w(k+i) which satisfy 2.1 from
        search Walsh code list W(k)
    2.3 set j ← j+1
   }

---

After performing the search procedure 2, it is determined in step 925 whether there are any remaining orthogonal codes in the search list W(k) (i.e., is w(k,i)>0). When the search list W(k) is empty an indication is provided in step 929. However, when the list is not empty those remaining orthogonal codes in the list W(k) are assigned as the available orthogonal codes in step 927.

The operation of assigning orthogonal codes will be summarized as follows.

When the orthogonal code to be provided is of length $N=2^k$, the unused orthogonal codes w(k,i) of length N are written in the search list W(k) in step 915. Here, i is an orthogonal code number Wno which is a Hadamard matrix element number.

As an example of the embodiment of a system having orthogonality of length $N=2^K$, k=4, 5, 6, it is assumed that the orthogonal code to be provided is of length $N=2^K$, k is 5, and there are three orthogonal code lengths of k=4, k=5 and k=6. In addition, it is assumed that the orthogonal codes w(k,i) written in the search list W(k) are w(5,10), w(5,11), w(5,12), w(5,26), w(5,27) and w(5,28) of i=10, 11, 12, $(10+2^5/2)\bmod 2^5=26$, $(11+2^5/2)\bmod 2^5=27$ and $(12+2^5/2)\bmod 2^5=28$. Furthermore, for simplicity, such a pair of orthogonal codes w(5,10) and w(5,26), a pair of orthogonal codes w(5,11) and w(5,27) and a pair of orthogonal codes w(5,12) and w(5,28) are respectively referred to as half complement orthogonal codes with respect each other.

The orthogonal codes presently not in use or the orthogonal codes of interest are represented as follows: Here, the orthogonal codes w(6,28) and w(4,11) are in use.

That is, if we let w(4,10)=B, w(4,11)=C and w(4,12)=D, then we can represent as follows from the Hadamard transformation.

w(5,10)=BB, w(5,11)=CC, w(5,12)=DD, w(5,26)=B$\overline{\text{B}}$, w(5,27)=C$\overline{\text{C}}$, w(5,28)=D$\overline{\text{D}}$, w(6,11)=CCCC, w(6,26)=BB$\overline{\text{BB}}$, w(6,27)=CC$\overline{\text{CC}}$, w(6,28)=DD$\overline{\text{DD}}$, w(6,43)=CC$\overline{\text{CC}}$, w(6,58)=B$\overline{\text{B}}$BB, w(6,59)=C$\overline{\text{C}}$CC and w(6,60)=D$\overline{\text{D}}$DD.

The barred codes represent complementary codes.

Combinations of the orthogonal codes are shown in the following Table 8, in which it is assumed that the orthogonal codes w(6,28), w(5,10), w(5,12) and w(4,11) are in use. In Table 8, the orthogonal codes of length k=5 have a relationship (half complement orthogonal code to each other) to the search list W(k=5). Table 8 shows the orthogonal codes, when the orthogonal code w(6,28) is in use and the orthogonal code w(4,11) is not in use. Further, the underlined orthogonal codes in Table 8 are the orthogonal codes in the search list W(k).

TABLE 8

| k = 4 | k = 5 | k = 6 |
|---|---|---|
|  |  | w(6,11)=CCCC |
|  | w(5,10)=BB | w(6,26)=B$\overline{\text{B}}$B$\overline{\text{B}}$ |
| w(4,10)=B | w(5,11)=CC | w(6,27)=C$\overline{\text{C}}$C$\overline{\text{C}}$ |
| w(4,11)=C | w(5,12)=DD | w(6,28)=D$\overline{\text{D}}$D$\overline{\text{D}}$ |
| w(4,12)=D | w(5,26)=B$\underline{\overline{\text{B}}}$ | w(6,43)=CC$\overline{\text{CC}}$ |
|  | w(5,27)=C$\underline{\overline{\text{C}}}$ | w(6,58)=B$\overline{\text{B}}$BB |
|  | w(5,28)=D$\underline{\overline{\text{D}}}$ | w(6,59)=C$\overline{\text{C}}$CC |
|  |  | w(6,60)=D$\overline{\text{D}}$DD |

Referring collectively to Table 8 and FIG. 9, in step 917, search procedure 1, a search is conducted of search list W(k) of orthogonal codes w(5,11), w(5,26), w(5,27) and w(5,28) to determine which codes in the list are not orthogonal with those orthogonal codes of length $2^{k+1}$ presently in use. The codes in the list which do not satisfy the orthogonality test with codes of length $2^{k+1}$ are deleted from the search list W(k). As a result, in accordance with the search procedure 1, orthogonal code w(5,28) does not satisfy the criteria in that it is not orthogonal with orthogonal code w(6,28), presently in use. Therefore, code w(5,28) is deleted from the search list W(k).

Thus, after the search procedure 1 is performed, the search list contains W(k)={w(5,11), w(5,26), w5,27)}. Since the search list is not empty, W(k)=3, the condition of step 919 (the number of W(k)>0) is satisfied. Further, since the half complement orthogonal code of orthogonal codes w(5,26) and w(5,(26+16)mod 32)=w(5,10) are already in use, the condition of step 921 is also satisfied. Accordingly, the orthogonal code w(5,26) is assigned as an available orthogonal code.

If the orthogonal code w(5,10) is not in use then the elements of the search list W(k) after performing the search procedure 1 are w(5,10), w(5,11), w(5,26) and w(5,27), therefore the search list W(k) has no orthogonal code satisfying step 921. Then, the search procedure 2 is performed in step 923. In the search procedure 2, for those orthogonal codes of length $2^{k-1}$ (i.e., k-1=4) in the search list W(k), those which are not orthogonal with the orthogonal codes presently in use are deleted from the search list W(k). Since the orthogonal code w(4,11)=C is in use, the orthogonal codes w(5,11)=CC and w(5,27)=C$\overline{\text{C}}$ are deleted from the search list W(k). As a result, the orthogonal codes stored in the search list W(k) are W(k=5)={w(5,10), w(5,26)}, which satisfies the condition of step 925. Thus, in step 927, the orthogonal codes w(5,10) and w(5,26) are assigned as the available orthogonal codes.

Assignment of the orthogonal codes is performed by the decision block 213 of FIG. 2. In assigning new orthogonal codes of length N, the decision block 213 first determines whether there are available orthogonal codes among the orthogonal codes of length N to be used. When there are available orthogonal codes of length N, the decision block 213 examines the available orthogonal codes to determine whether there are orthogonal codes not satisfying orthogonality with the orthogonal codes for the forward channel assigned to the other existing forward links and avoids assigning those corresponding correlated codes, if any. When there are available orthogonal codes available according to the procedure of FIG. 9, the corresponding orthogonal code length and number information is output to assign the orthogonal codes. Accordingly, in a CDMA communication system, when channel data is transmitted at a variable data rate, the base station can effectively assign orthogonal codes to the mobile station such that the orthogonal codes assigned to the different mobile stations and channels still maintain orthogonality with new orthogonal codes. Therefore, the communication system supporting the variable data rate can efficiently use the orthogonal code resources and quickly assign the orthogonal codes.

The term "rate" used in connection with FIGS. 7A, 7B and 8 refers to the coding rate and/or the length of the orthogonal code. A "first rate change condition" means a condition for switching from the higher rate to the lower rate, and a "second rate change condition" means a condition for switching from the lower rate to the higher rate. For example, the first rate change condition for changing the higher rate to the lower rate means that the channel environment is changed from, for example, a state where the 1/3 coding rate and the orthogonal code of length 256 are used to a state where the 1/6 coding rate and the orthogonal code of length 128 are used. Likewise, the second rate change condition for changing the lower rate to the higher rate means that the channel environment is changed from, for example, a state where the 1/6 coding rate and the orthogonal code of length 128 are used to a state where the 1/3 coding rate and the orthogonal code of length 256 are used. In the present embodiment, when the higher coding rate is used, the longer orthogonal code is assigned, and when the lower coding rate is used, the shorter orthogonal code is assigned, to maintain a constant data rate.

Referring to FIGS. 7A and 7B, the decision block 213 of the base station analyzes the received signal in step 711, to determine whether the rate change request message is received from a mobile station. When the rate change request message is received from the mobile station in step 711, the decision block 213 of the base station determines in step 713 whether the received rate change request message represents a change to the higher rate or to the lower rate.

If the received rate change request message represents a change to the lower rate in step 713, the decision block 213 of the base station examines, in step 715 whether the first rate change condition is satisfied. Here, the first rate change condition where the base station decreases the coding rate, represents the conditions shown in the following Table 9. In the embodiment, it is assumed that the first rate change condition is satisfied in the case where at least three, or two, conditions including condition 1 and condition 4 in Table 9 are satisfied.

TABLE 9

| Condition | Decision |
|---|---|
| 1 | $\text{(Tx power to the MS)} \geq \dfrac{\text{(total available at BS for all forwrad link in the same FA)} - \text{(power margin)}}{\text{number of MSs in service in the same FA}}$ |
| 2 | (average reverse link received signal strength (i.e., RSSI) for a particular duration) $\leq \text{Th}_{\text{rssi}} - \sigma_{\text{rssi}}$ |
| 3 | (average reverse link SNR for a particular duration) $\leq \text{Th}_{\text{snr}} - \sigma_{\text{snr}}$ |
| 4 | any available orthogonal code? |

In Table 9, condition 1 is satisfied when the transmission power to the mobile station is higher than or equal to a value obtained by dividing a value:

(total available power at the base station for all forward link in the same FA)−(a power margin)

by the number of mobile stations in service in the same area. The second condition (2) is satisfied when an average reverse link received signal strength (i.e., RSSI or Ec/Io of the forward pilot channel), is used in the above case for a particular duration is lower than or equal to a value obtained by subtracting a standard deviation of the RSSI, $\sigma_{rssi}$ from a threshold RSSI, $\text{Th}_{rssi}$. Condition 3 is satisfied when an average reverse link SNR for a particular duration is lower than or equal to a value obtained by subtracting a standard deviation of the SNR, $\sigma_{snr}$ from a threshold SNR, $\text{Th}_{snr}$. Condition 4 is satisfied when there are available orthogonal codes among the orthogonal codes of the requested length. Here, the orthogonal codes are searched for and extracted based on the procedure of FIG. 9. That is, as the result of the search, even though there may exist available orthogonal codes, they are considered as unavailable orthogonal codes when they do not satisfy orthogonality with the other orthogonal codes in use. That is, the orthogonal codes satisfying condition 4 should have a length corresponding to the requested coding rate and have orthogonality with the forward channel for the other mobile stations.

To satisfy the first rate change condition, conditions 1 and 4 in Table 9 should be satisfied. Accordingly, when conditions 1 and 4 are satisfied, the present rate can be changed to the lower rate. However, when conditions 2 and 3 are satisfied while conditions 1 and 4 are unsatisfied, the rate change is not processed when at least 3 conditions are used for decision criteria. That is, only when conditions 1 and 4 are both satisfied, can the present rate be changed to the lower rate. Here, it is assumed that even when one or both of the conditions 2 and 4 are satisfied while the conditions 1 and 4 are both satisfied, the first rate change condition is satisfied.

Accordingly, when the first rate change condition is satisfied in step 715, the base station sends to the mobile station information about the requested coding rate and the assigned orthogonal code together with the response message, in step 717. For example, when the 1/3 coding rate is presently used, it can be changed to the 1/6 coding rate, and when the ½ coding rate is presently used, it can be change to 1/4 coding rate. In this case, the shorter orthogonal codes are assigned which have the orthogonality with the orthogonal codes used for the other forward link channels. The decision block 213 includes a table for storing the orthogonal codes previously set by the Hadamard transform, and assigns the orthogonal codes by selecting from the table the orthogonal codes having orthogonality with other orthogonal codes based on the procedure of FIG. 9. After sending the changed coding rate and the orthogonal information, the decision block 213 of the base station outputs the coding select signal Csel and the orthogonal code number and length signals Wno and Wlength for changing the present rate to the requested lower rate in step 719, thereby to change the coding rate and the orthogonal code of the channel encoder in the base station.

Then, as illustrated in FIG. 3, in the base station, the selector 301 outputs the input data to the second encoder 312 and the selector 393 outputs the decimated long code from the decimator 392 to the second mixer 342 according to the coding select signal Csel. Further, the second orthogonal modulator 362 multiplies the symbol data output from the second encoder 352 by the newly assigned orthogonal code. Therefore, the rate of the orthogonal spread signal applied to the spreader 370 is changed to the lower rate. In addition, the decision block 213 of the mobile station also outputs the received Csel, Wno and Wlength. Thus, as illustrated in FIG. 4, the selector 420 applies the received signal output from the despreader 410 to the second orthogonal demodulator 432, which multiplies the despread signal by the newly assigned orthogonal code. Furthermore, the selector 493 outputs the decimated long code from the decimator 492 to the second mixer 452 according to the coding select signal Csel, thereby outputting the data decoded in the second decoder 482 as the received data.

However, when the rate change request message represents the change to the higher rate in step 713, the decision block 213 of the base station determines in step 721 whether the second rate change condition is satisfied. Here, the second rate change condition where the base station increases the rate, represents the conditions shown in the following Table 10. In the present embodiment, it is assumed that the second rate change condition is satisfied in the case where at least two, or one, conditions can be set including condition 1 in Table 10 are satisfied.

TABLE 10

| Condition | Decision |
|---|---|
| 1 | (Tx power to the MS) $\leq$ (average Tx power to all MSs) − $\sigma_{\text{pwr}}$ |
| 2 | (average reverse link received signal strength (i.e., RSSI) for a particular duration) $\geq \text{Th}_{\text{rssi}} + \sigma_{\text{rssi}}$ |
| 3 | (average reverse link SNR for a particular duration) $\leq \text{Th}_{\text{snr}} + \sigma_{\text{snr}}$ |

In Table 10, condition 1 is satisfied when transmission power to the mobile station is lower than or equal to a value obtained by subtracting a standard deviation, $\sigma_{pwr}$, of the average transmission power for the respective forward traffic channels from an average transmission power to all mobile stations. Condition 2 is satisfied when an average reverse link received signal strength (i.e., RSSI or Ec/Io of the forward pilot channel) for a particular duration is higher than or equal to a value obtained by adding the standard deviation of the RSSI, $\sigma_{rssi}$, to the threshold RSSI, $\text{Th}_{rssi}$. Condition 3 is satisfied when an average reverse link SNR for a particular duration is higher than or equal to a value obtained by adding the standard deviation of the SNR, $\sigma_{snr}$, to the threshold SNR, $Th_{snr}$.

To satisfy the second rate change condition, condition 1 in Table 10 should be satisfied. Accordingly, when condition 1 is satisfied, the present coding rate can be changed to the higher coding rate and the length of the orthogonal code can also be changed after the searching process as described in the algorithm of FIG. 9. However, when conditions 2 and 3 are satisfied while condition 1 is unsatisfied, the coding rate and the orthogonal code are not changed. That is, only when condition 1 is satisfied can the present rate can be changed to the higher rate. Here, it is assumed that even when one or both of the conditions 2 and 3 are satisfied while condition 1 is satisfied, the second rate change condition is satisfied.

Accordingly, when the second rate change condition is satisfied in step 721, the base station sends to the mobile station the information about the requested coding rate and the assigned orthogonal code together with the response message, in step 717. For example, when the present coding rate is 1/6, the FEC rate can be changed to the 1/3, and when the present coding rate 1/4, it can be change to ½. In this case, as the coding rate is increased, the longer orthogonal codes can be assigned which have the orthogonality with the orthogonal codes used for the other forward link channels. After sending the changed coding rate and orthogonal code, the decision block 213 of the base station outputs the coding select signal Csel and the orthogonal code number and length signals Wno and Wlength for changing the present rate to the requested higher rate in step 719, thereby to change the coding rate and the orthogonal code of the channel encoder in the base station.

Then, as illustrated in FIG. 3, the selector 301 outputs the input data to the first encoder 311 and the selector 393 outputs the decimated long code from the decimator 392 to the first mixer 341 according to the coding select signal Csel. Further, the first orthogonal modulator 361 multiplies the symbol data output from the first encoder 351 by the newly assigned orthogonal code. Therefore, the rate of the orthogonal spread signal applied to the spreader 370 is changed to the higher rate. In addition, the decision block 213 of the mobile station also outputs the received Csel, Wno and Wlength. Thus, as illustrated in FIG. 4, the selector 420 applies the received signal output from the despreader 410 to the first orthogonal demodulator 431, which multiplies the despread signal by the newly assigned orthogonal code. Furthermore, the selector 493 outputs the decimated long code from the decimator 492 to the first mixer 451 according to the coding select signal Csel, so that the data decoded in the first decoder 481 is applied to the receiver as the received data.

However, when the rate change request message from the mobile station does not satisfy both the first or second rate change conditions, the decision block 213 of the base station perceives this in step 715 or 721, and sends to the mobile station a response message indicating that a change of coding rate and the corresponding orthogonal code is not possible, in step 723.

When the rate change request message is not received from the mobile station in step 711, the procedure of FIG. 7B is performed to determine whether or not to change the rate. Also, even when the rate change request message is received from a particular mobile station, the base station can perform the procedures of FIGS. 7A and 7B in parallel to determine whether or not to change the rates of the other mobile stations which have not requested the rate change. In FIG. 7B, the decision block 213 of the base station detects the power consumption of the forward traffic channel for the mobile stations and changes the rates according to the detection. That is, the decision block 213 selects the lower rate for the mobile station which consumes the high power, and can select the higher rate for the mobile station which consumes the low power.

First, a description will be given as to the rate change operation of the mobile station which consumes the high power. The decision block 213 of the base station searches for the forward link and the mobile station which consume the highest power among the forward links using the higher rate encoder, in step 751. The decision block 213 determines in step 753 whether the searched mobile station can change the rate or not by consulting the internal search list. When the searched mobile station can change the rate, the decision block 213 checks in step 755 whether the first rate change condition is satisfied or not. Here, it is assumed that the first rate change condition represents the case where at least three conditions including the conditions 1 and 4 in Table 9 are satisfied. When the first rate change condition is unsatisfied, the decision block 213 returns to step 711 to repeat the procedure of FIG. 7B. However, when the first rate change condition is satisfied in step 755, the decision block 213 of the base station sends to the mobile station a request message for selecting the lower rate and performs a procedure for decreasing the coding rate of the forward channel, in step 757.

Next, a description will be given as to the rate change operation of the mobile station which consumes the low power. The decision block 213 of the base station searches for the forward link and the mobile station which consume the lowest power among the forward links using the lower rate encoder, in step 759. The decision block 213 determines in step 761 whether the searched mobile station can change the rate or not by consulting the internal search list. When the searched mobile station can change the rate, the decision block 213 checks in step 763 whether the second rate change condition is satisfied or not. Here, it is assumed that the first rate change condition represents the case where at least two conditions including the condition 1 in Table 10 are satisfied. When the second rate change condition is unsatisfied, the decision block 213 returns to step 711 to repeat the procedure of FIG. 7B. However, when the second rate change condition is satisfied in step 763, the decision block 213 of the base station sends to the mobile station a request message for selecting the higher rate and performs a procedure for increasing the coding rate of the forward channel, in step 765.

However, when the mobile station having the highest power consumption or the lowest power consumption can not change the rate during the call, such as the conventional IS-95 mobile station, the decision block 213 of the base station perceives this in step 753 or 761, and goes to step 767 to delete from the search list the mobile station which cannot change the rate. After deletion, the decision block 213 returns to step 711 to repeat the procedure of FIG. 7B.

Referring to FIG. 8, in step 811, the decision block 213 of the mobile station analyzes the received signal to determine whether the rate change request message is received from the base station. When the rate change request message is received from the base station in step 811, the decision block 213 of the mobile station checks in step 813 whether the received rate change request message represents the change to the higher rate or to the lower rate.

When the received rate change request message represents the change to the lower rate in step 813, the decision block 213 of the mobile station determines in step 815 whether a first rate change condition is satisfied or not. Here, the first rate change condition where the mobile station selects the lower rate, represents a case in which at least two of the conditions in the following Table 11 are satisfied.

TABLE 11

| Condition | Decision |
|---|---|
| 1 | (average Tx power for a particular duration) $\geq$ Th$_{pwr}$ + $\sigma_{pwr}$ |
| 2 | (average forward link received signal strength (i.e., RSSI or forward pilot Ec/Io) for a particular duration) $\leq$ Th$_{rssi}$ − $\sigma_{rssi}$ |
| 3 | (average forward traffic channel SNR for a particular duration) $\leq$ Th$_{snr}$ − $\sigma_{snr}$ |

In Table 11, condition 1 is satisfied when an average reverse transmission power for a particular duration is higher than or equal to a value obtained by adding a standard deviation $\sigma_{pwr}$ to a threshold power Th$_{pwr}$. Condition 2 is satisfied when an average received forward link RSSI (forward pilot Ec/Io may also be used) for a particular duration is lower than or equal to a value obtained by subtracting a standard deviation $\sigma_{rssi}$ from a threshold RSSI Th$_{rssi}$, A condition 3 is satisfied when an average received forward link SNR for a particular duration is lower than or equal to a value obtained by subtracting a standard deviation $\sigma_{snr}$ from a threshold SNR Th$_{snr}$.

Here, it is assumed that at least two conditions out of the conditions 1 to 3 in Table 11 should be satisfied in order to satisfy the first rate change condition. When at least two of the conditions in Table 11 are satisfied, the present coding rate can be changed to the lower rate and the length of the orthogonal code can also be changed accordingly.

Accordingly, when the first rate change condition is satisfied in step 815, the mobile station sends to the base station the requested coding rate and the assigned orthogonal code together with a response message in step 817, and changes the coding rate and the orthogonal code according to the change rate in step 819 to perform the communication service at the changed rate.

However, when the received rate change request message represents the change to the higher rate in step 813, the decision block 213 of the mobile station examines in step 821 whether a second rate change condition is satisfied or not. Here, second rate change condition where the mobile station changes the present rate to the higher rate, represents a condition in which at least two of the conditions in the following Table 12 are satisfied.

TABLE 12

| Condition | Decision |
|---|---|
| 1 | (average reverse Tx power for a particular duration) $\leq$ Th$_{pwr}$ − $\sigma_{pwr}$ |
| 2 | (average forward link received signal strength (i.e., RSSI or Ec/Io of the forward pilot) for a particular duration) $\geq$ Th$_{rssi}$ + $\sigma_{rssi}$ |
| 3 | (average reverse link SNR for a particular duration) $\geq$ Th$_{snr}$ + $\sigma_{snr}$ |

In Table 12, the condition 1 is satisfied when an average reverse transmission power for a particular duration is lower than or equal to a value obtained by subtracting a standard deviation, $\sigma_{pwr}$, of the reverse link from a threshold power Th$_{pwr}$. Condition 2 is satisfied when an average received forward link signal strength (i.e., RSSI or pilot Ec/Io) for a particular duration is higher than or equal to a value obtained by adding a standard deviation of the RSSI, $\sigma_{rssi}$, to a threshold RSSI Th$_{rssi}$. Condition 3 is satisfied when an average received forward traffic channel SNR for a particular duration is higher than or equal to a value obtained by adding a standard deviation of the SNR, $\sigma_{snr}$, to a threshold SNR Th$_{snr}$.

Here, it is assumed that at least two of the conditions 1 to 3 in Table 12 should be satisfied in order to satisfy the second rate change condition. When at least two of the conditions in Table 12 are satisfied, the present FEC rate can be changed to the higher rate and the length of the orthogonal code can also be changed accordingly.

Accordingly, when the second rate change condition is satisfied in step 821, the mobile station sends to the base station the requested coding rate and the assigned orthogonal code together with a response message in step 817. For example, when the present coding rate is 1/6, it can be changed to 1/3, and when the present coding rate is 1/4, it can be changed to ½. Further, the longer orthogonal code can be assigned after the searching process as described in FIG. 9. After sending the changed coding rate and orthogonal code, the decision block 213 of the mobile station outputs the coding select signal Csel and the orthogonal code number and length signals Wno and Wlength for selecting the requested higher rate to change the coding rate of the encoder and the orthogonal code in step 819, thereby to perform the communication service at the changed rate.

However, when the rate change request message received from the base station does not satisfies both the first and second rate change conditions, the decision block 213 of the mobile station perceives this in step 815 or 821, and sends to the mobile station a response message representing impossibility of changing the coding rate and the orthogonal code in step 823, terminating the to procedure.

As stated above, the base station and the mobile station change the coding rate and the orthogonal code according to the rate change request message or the signal state received from the other party, so that they can adaptively maintain a good rate according to the channel environment. Although FIGS. 7A, 7B and 8 show an embodiment which changes both the coding rate and the orthogonal code to change the rate, it is also possible to change the rate by selectively changing the coding rate or the orthogonal code according to the channel environment.

The forward traffic channel transmission device of FIG. 3 has the structure of using a single carrier. However, with the progress of the communication technology and service, the subscribers to the communication service are increasing in number. Also, there have been proposed many methods for meeting the subscribers' demands for the services. As one of the methods, the TIA/EIA TR45.5 conference has proposed the fundamental channel forward link structure for the multicarrier CDMA system. A method using the multicarrier overlays three forward link carriers for the multicarrier system on three 1.25 MHz bandwidths used in the IS-95 CDMA system, or selects the three 1.25 MHz bands with one forward channel. In this case, all the three carriers used in the multicarrier system have independent transmission powers.

Accordingly, when the transmission device of the invention is applied to the multicarrier system, the decision block 213 of FIG. 2 should generate the orthogonal code number and length signals Wno and Wlength for generating the orthogonal codes for the multicarrier system together with the coding select signal Csel for selecting the coding rate. Since the respective carriers are independent of one another, the Walsh code number signal Wno output from the decision block 213 should also be able to assign the orthogonal codes as many as the number of the carriers.

Figure 10:
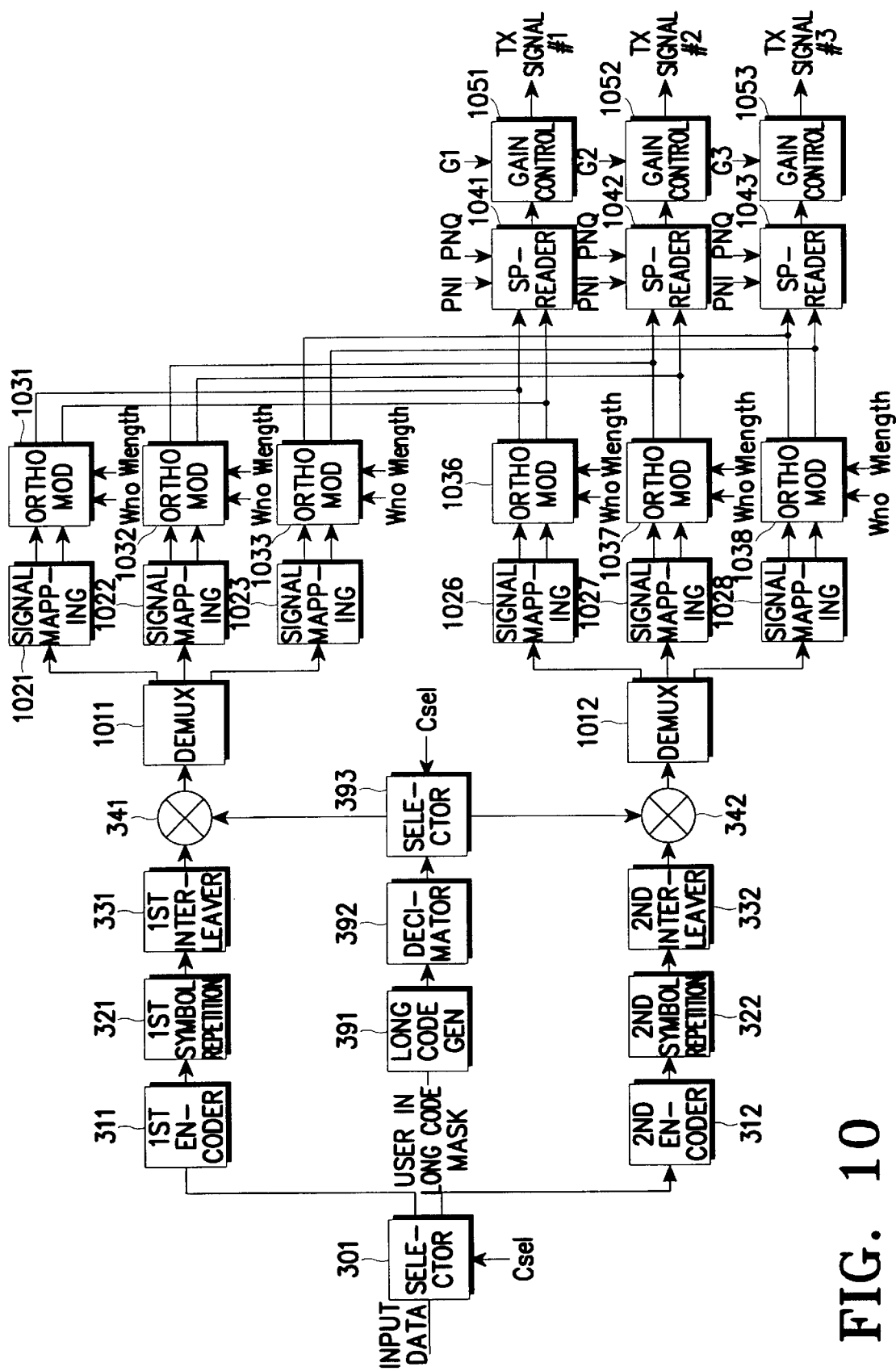
FIG. 10 is a diagram illustrating a multicarrier forward traffic channel transmission device including a plurality of encoders having different rates and adaptively selects the encoders according to the channel environment in accordance with an embodiment of the present invention.

FIG. 10 illustrates a multicarrier transmission device according to another embodiment of the present invention. It is assumed that the forward traffic channel transmission device uses 3 carriers, and includes a rate 1/3 encoder, a rate 16 encoder and a plurality of orthogonal modulators for independently modulating the signals according to the three carriers.

Referring to FIG. 10, a selector 301 has a first output end connected to a first encoder 311 and a second output end connected to a second encoder 312. The selector 301 receives input data to be transmitted and selectively outputs the input data to the first encoder 311 or the second encoder 312 according to the select signal Csel output from the decision block 213.

The first encoder 311, upon reception of the data input from the selector 301, encodes and punctures the input data into data symbols at the 1/3 coding rate (the first coding rate). That is, the first encoder 311 encodes one input data bit into three symbols. A convolutional encoder or a turbo encoder can be used for the first encoder 311. A first symbol repetition part 321 receives the data encoded at the first coding rate, and repeats the symbols output from the first encoder 311 so as to match the symbol rates of the data having different bit rates. A first interleaver 331 interleaves first encoded data output from the first symbol repetition part 321. A block interleaver can be used for the first interleaver 331.

The second encoder 312, upon reception of the data input from the selector 301, encodes and punctures the input data into data symbols at the coding rate 1/6 (the second coding rate). That is, the second encoder 312 encodes one input data bit into six symbols. A convolutional encoder or a turbo encoder can be used for the second encoder 312. A second symbol repetition part 322 receives the data encoded at the second coding rate, and repeats the symbols output from the second encoder 312 so as to match the symbol rates of the data having different bit rates. A second interleaver 332 interleaves second encoded data output from the second symbol repetition part 322. A block interleaver can be used for the second interleaver 332.

A long code generator 391 generates long codes for the user identification, which are differently assigned to the respective subscribers. A decimator 392 decimates the long codes so as to match a rate of the long codes to a rate of the symbols output from the interleavers 331 and 332. A selector 393 selectively outputs the decimated long code output from the decimator 392 to a mixer 341 or a mixer 342 according to the encoder select signal Csel. The selector 393 switches the decimated long code to the first mixer 341 to select the 1/3 coding rate and to the second mixer 342 to select the 1/6 coding rate. The mixer 341 mixes the first encoded data output from the first interleaver 331 with the long code output from the selector 393. The second mixer 342 mixes the second encoded data output from the second interleaver 332 with the long code output from the selector 393.

A first demultiplexer 1011 demultiplexes data output from the first mixer 341 to the respective carriers in sequence. Signal mapping parts 1021–1023 map levels of the binary data output from the first demultiplexer 1011 by converting data "0" to "+1" and data "1" to "−1". Orthogonal modulators 1031–1033, in the same number as that of the carriers, each include a first orthogonal code generator (not shown) which generate a first orthogonal code for orthogonally modulating the first encoded data according to the orthogonal code number and length Wno and Wlength output from the decision block 213. The orthogonal modulators 1031–1033 multiply the first orthogonal code generated according to the orthogonal code number and length Wno and Wlength by the data output from the signal mapping parts 1021–1023, respectively, to generate a first orthogonal modulation signal. Here, it is assumed that the Walsh code is used for the orthogonal code and a Walsh code of length 256 is used for the data encoded at the first coding rate of 1/3.

A second demultiplexer 1012 demultiplexes data output from the second mixer 342 to the respective carriers in sequence. Signal mapping parts 1026–1028 map levels of the binary data output from the second demultiplexer 1012 by converting data "0" to "+1" and data "1" to "−1". Orthogonal modulators 1036-1038, in the same number as that of the carriers, each include a second orthogonal code generators (not shown) which generate a second orthogonal code for orthogonally modulating the second encoded data according to the orthogonal code number and length Wno and Wlength output from the decision block 213. The orthogonal modulators 1036–1038 multiply the second orthogonal code generated according to the orthogonal code number and length Wno and Wlength by the data output from the signal mapping parts 1021–1023, respectively, to generate second orthogonal modulation signals. Here, it is assumed that the Walsh code is used for the orthogonal code and a Walsh code of length 128 is used for the data encoded at the second coding rate of 1/6.

Spreaders 1041–1043 combine the first and second orthogonal modulation signals output from the orthogonal modulators 1031–1033 and second orthogonal modulators 1036–1038 with the received spreading sequence to spread transmission signals. Here, the PN sequence can be used for the spreading sequence and the QPSK spreaders can be used for the spreaders. Gain controllers 1051–1053 control gains of the spread signals input from the spreaders 1041–1043 according to gain control signals G1–G3. The respective gain controllers 1051–1053 output different carriers.

As described above, during the call setup or call processing, the base station and the mobile station change the coding rate and the orthogonal code according to the channel environment, in order to provide the communication service in the good channel environment. By changing the FEC rate for all the link channels of the CDMA communication system, it is possible to improve the performance of the reception device and save the transmission power of the transmission device. In addition, it is possible to simply change the rate using the message.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel communication apparatus for a wireless communication system comprising:
 a channel receiver for receiving a channel signal;
 a controller for analyzing the received channel signal to assess a channel environment, said assessment being used by said channel receiver to generate a coding rate select signal and orthogonal code information; and
 a channel transmitter including: a channel encoder for adaptively encoding transmission data at a coding rate selected according to the coding rate select signal, and an orthogonal modulator for generating an orthogonal code according to the orthogonal code information to spread the encoded transmission data with the generated orthogonal code;

wherein said controller performs said channel assessment by:
  (i.) measuring at least one of a receiving power, interference, a bit error rate (BER) and a signal-to-noise ratio (SNR) from the received channel signal,
  (ii.) comparing the measured values with corresponding upper threshold values to generate the coding rate select signal for decreasing the coding rate and the orthogonal code information by reducing a length of the orthogonal code when the measured values exceed the upper threshold values, and
  (iii.) comparing the measured values with corresponding lower threshold values to generate the coding rate select signal for increasing the coding rate and the orthogonal code information by increasing the length of the orthogonal code when the measured values are below the lower threshold values.

2. The channel communication apparatus as claimed in claim 1, wherein said channel transmitter further comprises:
  at least two channel encoders having different coding rates, for encoding an input transmission signal at a corresponding coding rate;
  at least two interleavers for interleaving the corresponding encoded data by a frame unit;
  selectors for selectively connecting the input transmission signal to the channel encoders according to the coding rate select signal and selectively outputting an output of the corresponding interleaver;
  an orthogonal modulator for generating the orthogonal code corresponding to the orthogonal code information and spreading the encoded data output from the selected interleaver with the generated orthogonal code; and
  a pseudo-random noise (PN) spreader for PN spreading the orthogonal spread signal.

3. The channel communication device as claimed in claim 2, wherein said orthogonal code information includes a number and a length of the orthogonal code.

4. The channel communication apparatus as claimed in claim 1, wherein said channel receiver further comprises:
  a PN despreader for PN despreading the received signal;
  an orthogonal demodulator for generating an orthogonal code corresponding to the orthogonal code information and orthogonally despreading the PN despread signal;
  at least two deinterleavers for deinterleaving the orthogonally despread signal;
  at least two channel encoders having different coding rates, for encoding the deinterleaved signal at the corresponding encoding rate; and
  channel decoders for selectively connecting the orthogonally despread signal to the corresponding deinterleaver according to the coding rate select signal and selectively outputting an output of the channel encoder having the corresponding coding rate.

5. A channel communication apparatus for a wireless communication system using multiple carriers, comprising:
  a channel receiver for receiving a channel signal;
  a controller for analyzing the received channel signal to assess a channel environment, said assessment being used by said channel receiver to generate a coding rate select signal and orthogonal code information; and
  a channel transmitter including: a channel encoder for adaptively encoding transmission data at a coding rate selected according to the coding rate select signal, and an orthogonal modulator for generating an orthogonal code according to the orthogonal code information to spread the encoded transmission data with the generated orthogonal code;
  wherein said controller performs said channel assessment by:
    (i.) measuring at least one of a receiving power, interference, a bit error rate (BER) and a signal-to-noise ratio (SNR) from the received channel signal,
    (ii.) comparing the measured values with corresponding upper threshold values to generate the coding rate select signal for decreasing the coding rate and the orthogonal code information by reducing a length of the orthogonal code when the measured values exceed the upper threshold values, and
    (iii.) comparing the measure values with corresponding lower threshold values to generate the coding rate select signal for increasing the coding rate and the orthogonal code information by increasing the length of the orthogonal code when the measured values are below the lower threshold values.

6. The channel communication device as claimed in claim 5, wherein said channel transmitter comprises:
  at least two channel encoders each having different coding rates, for encoding an input transmission signal at the corresponding coding rate;
  interleavers for interleaving the encoded data output from the respective channel encoders, respectively;
  selectors for selectively connecting the input transmission signal to the channel encoder having the corresponding coding rate according to the coding rate select signal and selectively outputting an output of the corresponding interleaver;
  a demultiplexer for demultiplexing the encoded data output from the selectors to the respective carriers;
  orthogonal modulators for generating the orthogonal code corresponding to the orthogonal code information and spreading the encoded data output from the demultiplexer with the generated orthogonal code; and
  transmitters for PN spreading the orthogonal spread signals and transmitting the PN spread signals by carrying them on the corresponding carriers, respectively.

7. The channel communication device as claimed in claim 6, wherein said orthogonal code information includes a number and a length of the orthogonal code.

8. The channel communication device as claimed in claim 6, wherein said demultiplexer uniformly distributes the encoded data to the respective carriers.

9. The channel communication device as claimed in claim 5, wherein said channel receiver comprises:
  PN despreaders for frequency shifting the received multicarrier signal using the corresponding carriers and PN despreading the frequency-shifted signals;
  orthogonal demodulators for generating orthogonal codes corresponding to the orthogonal code information and despreading the PN despread signals with the corresponding orthogonal codes;
  a demultiplexer for demultiplexing outputs of the orthogonal demodulators;
  deinterleavers in the same number as that of the coding rates, for deinterleaving the despread signals;
  at least two channel encoders each having different coding rates, for encoding the deinterleaved signal at the corresponding encoding rate; and
  channel decoders for selectively connecting the orthogonally despread signal to the corresponding deinterleaver according to the coding rate select signal and selectively outputting an output of the channel encoder having the corresponding coding rate.

10. A channel communication method for a wireless communication system, comprising the steps of:
  (i) analyzing an environment of a channel in service, and selecting a coding rate and orthogonal code when the channel environment satisfies a rate change condition;
  (ii) generating a message including the selected coding rate and the orthogonal code;
  (iii) sending the message to a mobile station; and
  (iv) upon reception of a response message from the mobile station responsive to said message;
  (v) switching from a presently selected coding rate and presently selected orthogonal code to the selected coding rate and orthogonal code in a channel transmitter;
  wherein said step of selecting a coding rate comprises the steps of:
    examining a call condition associated with the mobile station to determine whether the rate change condition is satisfied;
    when a first rate change condition is satisfied, selecting a coding rate lower than a present coding rate of the mobile station and selecting an orthogonal code having a length corresponding to the selected coding rate; and
    when a second rate change condition is satisfied, selecting a coding rate higher than a present coding rate of the mobile station and selecting an orthogonal code having a length corresponding to the selected coding rate.

11. The channel communication method as claimed in claim 10, wherein the first rate change condition is satisfied when a transmission power to the mobile station is higher than an average transmission power of all mobile stations presently in service and orthogonal codes corresponding to the selected coding rate are available.

12. The channel communication method as claimed in claim 11, wherein said average transmission power is obtained by subtracting a power margin from a maximum transmission power of the base station, and dividing the result by the number of mobile stations presently in service.

13. The channel communication method as claimed in claim 10, wherein said step of selecting an orthogonal code comprises the steps of:
  selecting an orthogonal code length corresponding to the selected coding rate, and writing unused orthogonal codes having the selected length in a search list;
  examining a correlation between the orthogonal codes in the search list and orthogonal codes longer than the orthogonal codes in the search list and deleting those orthogonal codes from the search list not satisfying orthogonality therebetween;
  determining whether complementary orthogonal codes of those undeleted orthogonal codes from said search list in use;
  selecting one of the orthogonal codes from said list whose complementary orthogonal code is in use;
  examining a correlation between the orthogonal codes in the search list and orthogonal codes shorter than the orthogonal codes in the search list and deleting the orthogonal codes not unsatisfying the orthogonality therebetween, when there is no orthogonal code whose complementary orthogonal code is in use; and
  selecting one of the orthogonal codes remaining in the search list after deletion.

14. The channel communication method as claimed in claim 10, wherein the first rate change condition is satisfied when a transmission power to the mobile station is higher than an average transmission power of all mobile stations presently in service, orthogonal codes corresponding to the selected coding rate are available, a receiving strength of a reverse link is lower than a reference strength value, and a signal-to-noise ratio of the reverse link is lower than a reference signal-to-noise ratio.

15. The channel communication method as claimed in claim 10, wherein the second rate change condition is satisfied when a transmission power to the corresponding mobile station is lower than a reference average transmission power to other mobile stations.

16. The channel communication method as claimed in claim 10, wherein the second rate change condition is satisfied when a transmission power to the corresponding mobile station is lower than a reference average transmission power to other mobile stations, a receiving strength of a reverse link is higher than a reference strength value, and a signal-to-noise ratio of the reverse link is higher than a reference signal-to-noise ratio.

17. A channel communication method for a wireless communication system, comprising the steps of:
  upon reception of a rate change request message from a mobile station, selecting a coding rate and orthogonal code according to the rate change request message and determining whether there exist available orthogonal codes corresponding to the selected coding rate;
  generating a response message Including information about the selected coding rate and orthogonal code and sending the generated response message to the mobile station initiating said rate change request message; and
  switching a present coding rate and orthogonal code of a channel transmitter to the selected coding rate and orthogonal code;
  wherein said step of selecting a coding rate comprises the steps of:
    examining a call condition with the mobile station to determine whether a rate change condition is satisfied;
    when a first rate change condition is satisfied, selecting a coding rate lower than a present coding rate of the mobile station and selecting an orthogonal code having a length corresponding to the selected coding rate; and
    when a second rate change condition is satisfied, selecting a coding rate higher than a present coding rate of the mobile station and selecting an orthogonal code having a length corresponding to the selected coding rate.

18. The channel communication method as claimed in claim 17, wherein the first rate change condition is satisfied when a transmission power to the mobile station is higher than an average transmission power of all mobile stations presently in service, and orthogonal codes corresponding to the selected coding rate are available.

19. The channel communication method as claimed in claim 18, wherein said average transmission power is obtained by subtracting a power margin from a maximum transmission power of the base station and then dividing the result by the number of the mobile stations presently in service.

20. The channel communication method as claimed in claim 17, wherein said orthogonal code selection step comprises the steps of:
  selecting an orthogonal code length corresponding to the selected coding rate, and writing unused orthogonal codes having the selected length in a search list;
  examining a correlation between the orthogonal codes in the search list and orthogonal codes longer than the orthogonal codes in the search list and deleting those orthogonal codes from said search list not satisfying orthogonality therebetween;
  determining whether complementary orthogonal codes of those undeleted orthogonal codes from said search list are in use;

selecting one of the orthogonal codes from said list whose complementary orthogonal codes is in use;

examining a correlation between the orthogonal codes in the search list and orthogonal codes shorter than the orthogonal codes in the search list and deleting the orthogonal codes not unsatisfying the orthogonality therebetween, when there is no orthogonal code whose complementary orthogonal code is in use; and selecting one of the orthogonal codes remaining in the search list after deletion.

21. The channel communication method as claimed in claim 17, wherein the first rate change condition is satisfied when a transmission power to the mobile station is higher than an average transmission power of all mobile stations presently in service, orthogonal codes corresponding to the selected coding rate are available, a receiving strength of a reverse link is lower than a reference strength value, and a signal-to-noise ratio of the reverse link is lower than a reference signal-to-noise ratio.

22. The channel communication method as claimed in claim 17, wherein the second rate change condition is satisfied when a transmission power to the corresponding mobile station is lower than a reference average transmission power to the other mobile stations.

23. The channel communication method as claimed in claim 17, wherein the second rate change condition is satisfied when a transmission power to the corresponding mobile station is lower than a reference average transmission power to the other mobile stations, a receiving strength of a reverse link is higher than a reference strength value, and a signal-to-noise ratio of the reverse link is higher than a reference signal-to-noise ratio.

24. A channel communication method for a wireless communication system, comprising the steps of:

analyzing an environment of a channel in service to determine whether a rate change condition is satisfied, and sending a rate change request message to a base station when the rate change condition is satisfied; and upon reception of a response message from a mobile station in response to said rate change request message, switching a presently used coding rate and a presently used orthogonal code, of a channel receiver to a coding rate and an orthogonal code corresponding to information included in the response message from the mobile station;

wherein the step of determining whether a rate change condition is satisfied comprises the steps of:

examining an environment of a channel in communication with the base station;

selecting a coding rate lower than a present coding rate, when a first rate change condition is satisfied; and selecting a coding rate higher than a present coding rate, when a second rate change condition is satisfied; and wherein the first rate change condition is satisfied when a condition selected from the group consisting of:

condition 1: an average reverse link transmission power is higher than an upper threshold transmission power;

condition 2: an average forward link receiving strength is lower than a lower threshold receiving strength; and condition 3: an average forward link signal-to-noise ratio is lower than a lower threshold signal-to-noise ratio;

is satisfied.

25. The channel communication method as claimed in claim 24, wherein the second rate change condition is satisfied when a condition selected from the group consisting of:

condition 1: an average reverse link transmission power is lower than a lower threshold transmission power;

condition 2: an average forward link receiving strength is higher than an upper threshold receiving strength; and condition 3: an average forward link signal-to-noise ratio is higher than an upperthreshold signal-to-noise ratio;

is satisfied.

26. A channel communication method for a wireless communication system, comprising the steps of:

upon reception of a rate change request message from a base station, selecting a coding rate and an orthogonal code according to information included in the request message;

sending a response message to the base station; and changing a presently used coding rate and orthogonal code of a channel receiver to the selected coding rate and orthogonal code;

wherein said step of selecting a coding rate comprises the steps of:

examining a call condition associated with the mobile station to determine whether the rate change condition is satisfied;

when a first rate change condition is satisfied, selecting a coding rate lower than a present coding rate of the mobile station and selecting an orthogonal code having a length corresponding to the selected coding rate; and when a second rate change condition is satisfied, selecting a coding rate higher than a present coding rate of the mobile station and selecting an orthogonal code having a length corresponding to the selected coding rate.

27. A channel communication method for a CDMA communication system, comprising the steps of:

(i.) upon reception of a rate change request message from a base station, determining whether a present coding rate and orthogonal code can be changed to a different coding rate and orthogonal code based on information in the request message;

(ii.) when the present coding rate and orthogonal code can be changed, changing the present coding rate and orthogonal code to the different coding rate and orthogonal code, and sending a response message to the base station indicating said changes; and (iii.) when the present coding rate and orthogonal code cannot be changed, generating and sending a message to the base station indicating that a change cannot occur;

wherein said step of determining whether the present coding rate and orthogonal code can be changed to the different coding rate and orthogonal code based on the information in the request message comprises the steps of:

examining a call condition associated with the mobile station to determine whether the rate change condition is satisfied;

when a first rate change condition is satisfied, selecting a coding rate lower than a present coding rate of the mobile station and selecting an orthogonal code having a length corresponding to the selected coding rate; and when a second rate change condition is satisfied, selecting a coding rate higher than a present coding rate of the mobile station and selecting an orthogonal code having a length corresponding to the selected coding rate.

* * * * *